United States Patent
Su et al.

(10) Patent No.: US 10,219,221 B2
(45) Date of Patent: Feb. 26, 2019

(54) USER EQUIPMENT TRANSMIT DUTY CYCLE CONTROL

(71) Applicant: Apple Inc., Cupertino, CA (US)

(72) Inventors: Li Su, San Jose, CA (US); Stephan V. Schell, San Mateo, CA (US); Jianxiong Shi, Dublin, CA (US); Sami M. Almalfouh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/839,252

(22) Filed: Dec. 12, 2017

(65) Prior Publication Data
US 2018/0124705 A1   May 3, 2018

Related U.S. Application Data

(63) Continuation of application No. 14/834,533, filed on Aug. 25, 2015, now Pat. No. 9,854,527.
(Continued)

(51) Int. Cl.
*H04L 12/28* (2006.01)
*H04W 52/02* (2009.01)
(Continued)

(52) U.S. Cl.
CPC ....... *H04W 52/0251* (2013.01); *H04J 3/1694* (2013.01); *H04W 52/0261* (2013.01);
(Continued)

(58) Field of Classification Search
CPC ... H04W 28/22; H04W 52/0277; Y02B 60/50
(Continued)

(56) References Cited

U.S. PATENT DOCUMENTS

| 5,430,760 A | 7/1995 | Dent |
| 6,360,085 B1 | 3/2002 | Walley |

(Continued)

OTHER PUBLICATIONS

Office Action for ROC (Taiwan) Patent Application No. 104128515, dated Nov. 9, 2016, pp. 1-18.
(Continued)

*Primary Examiner* — Asad M Nawaz
*Assistant Examiner* — Berhanu D Belete
(74) *Attorney, Agent, or Firm* — Meyertons Hood Kivlin Kowert & Goetzel, P.C.; Jeffrey C. Hood; Brian E. Moore

(57) ABSTRACT

In some embodiments, a user equipment device (UE) implements improved communication methods which include radio resource time multiplexing, dynamic sub-frame allocation, and UE transmit duty cycle control. In some embodiments, the UE may communicate with base stations using radio frames that include multiple sub-frames, transmit information regarding allocation of a portion of the sub-frames of a respective radio frame for each of a plurality of the radio frames, and transmit and receive data using allocated sub-frames and not using unallocated sub-frames. In some embodiments, the UE may operate according to a sub-frame allocation based on its current power state. The UE may transmit information to the base station and receive the sub-frame allocation based on at least the information. In some embodiments, the UE may switch transmit duty cycles based on an occurrence of a condition at the UE. The UE may inform the network of the switch.

20 Claims, 23 Drawing Sheets

Related U.S. Application Data

(60) Provisional application No. 62/196,823, filed on Jul. 24, 2015, provisional application No. 62/100,606, filed on Jan. 5, 2015, provisional application No. 62/043,355, filed on Aug. 28, 2014.

(51) Int. Cl.
*H04J 3/16* (2006.01)
*H04W 72/02* (2009.01)

(52) U.S. Cl.
CPC ....... *H04W 52/0277* (2013.01); *H04W 72/02* (2013.01); *Y02B 70/30* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/23* (2018.01); *Y02D 70/25* (2018.01); *Y02D 70/26* (2018.01)

(58) Field of Classification Search
USPC ........... 370/311; 455/127.5, 550.1, 561, 574, 455/67.11
See application file for complete search history.

(56) References Cited

U.S. PATENT DOCUMENTS

| | | | |
|---|---|---|---|
| 7,852,761 | B2 | 12/2010 | Neugebauer |
| 8,155,032 | B2 | 4/2012 | Lindoff et al. |
| 8,498,678 | B2 | 7/2013 | Tsfaty et al. |
| 8,553,639 | B2 | 10/2013 | Acharya et al. |
| 8,730,829 | B2* | 5/2014 | Hwang .................. H04L 5/001 370/252 |
| 8,792,930 | B1 | 7/2014 | Gopalakrishnan et al. |
| 8,934,424 | B2 | 1/2015 | Yin et al. |
| 9,002,391 | B1 | 4/2015 | Goyal et al. |
| 9,106,395 | B2 | 8/2015 | Lee et al. |
| 9,143,957 | B2* | 9/2015 | Sadek .................. H04W 16/14 |
| 9,215,039 | B2* | 12/2015 | Yin ...................... H04L 1/1822 |
| 9,295,004 | B2* | 3/2016 | Gopalakrishnan ..... H01Q 1/243 |
| 2004/0196015 | A1 | 10/2004 | Sutardja et al. |
| 2004/0204181 | A1 | 10/2004 | Cromer et al. |
| 2005/0237963 | A1 | 10/2005 | Storm |
| 2007/0291673 | A1 | 12/2007 | Demirhan et al. |
| 2008/0233992 | A1* | 9/2008 | Oteri .................. H04W 52/241 455/522 |
| 2008/0311865 | A1 | 12/2008 | Worfolk et al. |
| 2009/0017879 | A1 | 1/2009 | Tsfaty et al. |
| 2009/0270030 | A1 | 10/2009 | Jia et al. |
| 2012/0184327 | A1* | 7/2012 | Love .................. H04B 1/0064 455/552.1 |
| 2012/0207040 | A1* | 8/2012 | Comsa .............. H04W 72/1215 370/252 |
| 2012/0250591 | A1* | 10/2012 | Diao ...................... H04L 5/001 370/280 |
| 2013/0058315 | A1* | 3/2013 | Feuersanger ....... H04W 52/281 370/336 |
| 2013/0083704 | A1* | 4/2013 | Gaal ...................... H04L 5/001 370/277 |
| 2013/0083710 | A1* | 4/2013 | Chen .................. H04W 72/042 370/281 |
| 2013/0208587 | A1* | 8/2013 | Bala ...................... H04W 16/14 370/230 |
| 2013/0225149 | A1 | 8/2013 | Sadek et al. |
| 2013/0233170 | A1 | 9/2013 | Spiegelman et al. |
| 2013/0242824 | A1* | 9/2013 | Lee ...................... H04L 1/1819 370/281 |
| 2013/0250772 | A1* | 9/2013 | Yin .......................... H04L 5/16 370/241 |
| 2014/0064160 | A1 | 3/2014 | Verger et al. |
| 2014/0112254 | A1* | 4/2014 | Lindoff ............... H04W 74/002 370/328 |
| 2014/0329552 | A1* | 11/2014 | Gopalakrishnan ..... H01Q 1/243 455/522 |
| 2014/0364133 | A1 | 12/2014 | Chae et al. |
| 2015/0009865 | A1* | 1/2015 | Sharma ..................... H04L 5/16 370/277 |
| 2015/0011233 | A1* | 1/2015 | Kazmi .................. H04W 16/14 455/454 |
| 2015/0063099 | A1 | 3/2015 | Sadek |
| 2015/0085684 | A1 | 3/2015 | Sadek |
| 2015/0245247 | A1* | 8/2015 | Chen ...................... H04L 5/14 370/280 |
| 2016/0020849 | A1* | 1/2016 | Wu ...................... H04B 7/2615 370/281 |

OTHER PUBLICATIONS

International Search Report & Written Opinion, Application No. PCT/US2015/047049, dated Oct. 28, 2015, 10 pages.

\* cited by examiner

Example subframe allocation for Configuration 1

Example subframe allocation for Configuration 3

Example full-duplex allocation

Example half-duplex allocation for FDD

| TDD UL/DL Configuration | sfn0 | sfn1 | sfn2 | sfn3 | sfn4 | sfn5 | sfn6 | sfn7 | sfn8 | sfn9 |
|---|---|---|---|---|---|---|---|---|---|---|
| 0 | D | S | U | U | D | D | S | U | U | D |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 14A
(Prior Art)

| TDD UL/DL Configuration | sfn0 | sfn1 | sfn2 | sfn3 | sfn4 | sfn5 | sfn6 | sfn7 | sfn8 | sfn9 |
|---|---|---|---|---|---|---|---|---|---|---|
| 0 | - | - | 6 | - | 4 | - | - | 6 | - | 4 |
| 1 | - | - | 7,6 | 4 | - | - | - | 7,6 | 4 | - |
| 2 | - | - | 8,7,4,6 | - | - | - | - | 8,7,4,6 | - | - |
| 3 | - | - | 7,6,11 | 6,5 | 5,4 | - | - | - | - | - |
| 4 | - | - | 12,8,7,11 | 6,5,4,7 | - | - | - | - | - | - |
| 5 | - | - | 13,12,9,8,7,5,4,11,6 | - | - | - | - | - | - | - |
| 6 | - | - | 7 | 7 | 5 | - | - | 7 | 7 | - |

FIG. 14B
(Prior Art)

| TDD UL/DL Configuration | sfn0 | sfn1 | sfn2 | sfn3 | sfn4 | sfn5 | sfn6 | sfn7 | sfn8 | sfn9 |
|---|---|---|---|---|---|---|---|---|---|---|
| 0 | 4 | 6 | | | | 4 | 6 | | | |
| 1 | | 6 | | | 4 | | 6 | | | 4 |
| 2 | | | | 4 | | | | | 4 | 4 |
| 3 | 4 | | | | | | | | 4 | 4 |
| 4 | | | | | | | | | 4 | 4 |
| 5 | | | | | | | | | | 5 |
| 6 | 7 | 7 | | | | 7 | 7 | | | |

USER EQUIPMENT TRANSMIT DUTY CYCLE CONTROL

PRIORITY DATA

This application is a continuation of U.S. patent application Ser. No. 14/834,533, titled "User Equipment Transmit Duty Cycle Control", filed Aug. 25, 2015, by Li Su, Stephan V. Schell, Jianxiong Shi, and Sami M. Almalfouh, now U.S. Pat. No. 9,854,527, and which claims benefit of priority to U.S. Provisional Application Ser. No. 62/043,355, titled "Radio Resource Time Multiplexing and Sub-Frame Allocation for Low Power LTE", filed Aug. 28, 2014, by Li Su and Stephan V. Schell, U.S. Provisional Application Ser. No. 62/100,060, titled "Sub-Frame Allocation for Low Power LTE", filed Jan. 5, 2015 by Li Su, and U.S. Provisional Application Ser. No. 62/196,823, titled "User Equipment Transmit Duty Cycle Control", filed Jul. 24, 2015 by Li Su, Stephan V. Schell, Jianxiong Shi, and Sami M. Almalfouh which are all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless cellular communication, and more particularly, to methods for time multiplexing of radio resources, allocating sub-frames for reducing power consumption in a radio access technology such as LTE, and controlling a transmit duty cycle of a user equipment device.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE.

In order to support LTE cellular technology in low power applications, various basic issues should be considered. First, in low power applications there will a limited RF range for both transmit (TX) and receive (RX). In addition, there will be limited power, including both limited peak power and limited average TX power.

Further, it is desirable that any solutions to address low power applications be compatible/extendable to the existing LTE network, preferably with minimum to no impact on LTE NW capacity or LTE physical layers allowing easier implementation.

Therefore, improvements in the field would be desirable.

SUMMARY

Embodiments are presented herein of, inter alia, a user equipment (UE), base station (eNB), and improved communication methods which enable a UE that is power limited to share radio resources with other UEs. Additionally, improved communication methods which enable the UE to operate according to a sub-frame allocation based on its power state are presented as well as improved communication methods which enable the UE to switch between frame allocations based on current or anticipated power states.

Some embodiments relate to a user equipment device (UE) comprising at least one antenna, at least one radio, and one or more processors (or one or more processing elements) coupled to the radio. The at least one radio is configured to perform cellular communication using at least one radio access technology (RAT). The one or more processors (or one or more processing elements) and the at least one radio are configured to perform voice and/or data communications, as well as the methods described herein.

In some embodiments, a UE is configured to: communicate with one or more base stations using radio frames that include multiple sub-frames, transmit information regarding allocation of a portion of the sub-frames of a respective radio frame for each of a plurality of the radio frames for the UE, and transmit and receive data using allocated sub-frames and not using unallocated sub-frames. In some embodiments, the allocated sub-frames comprise portions of the sub-frames for each of the plurality of the radio frames and the portions are less than all of the sub-frames of each respective radio frame.

In some embodiments, a method includes a UE communicating with one or more base stations using radio frames that include multiple sub-frames, requesting allocation of a portion of the sub-frames of a respective radio frame for each of a plurality of the radio frames for the UE, and transmitting and receiving data using allocated sub-frames and not using unallocated sub-frames. In some embodiments, the allocated sub-frames comprise a portion of the sub-frames that is less than all of the sub-frames for each of the plurality of the radio frames.

In some embodiments, a base station includes a radio and a processing element operatively coupled to the radio. In some embodiments, the radio and the processing element are configured to receive, from a UE, a request for allocation of a portion of sub-frames for a respective radio frame of each of a plurality of radio frames, select sub-frames for the respective radio frame and allocate the selected sub-frames to the UE, and transmit data to the UE and receive data from the UE using the allocated sub-frames and not using unallocated sub-frames. In some embodiments, the allocated sub-frames make up a portion that is less than all of the sub-frames of the respective radio frame.

In some embodiments, the UE is configured to transmit information to the base station and receive a sub-frame allocation from the base station. The sub-frame allocation may be based on the information. The information may include one or more of a number of uplink (UL) sub-frames the UE may transmit in a frame, a number of downlink (DL) sub-frames the UE may transmit in a frame, and a minimum number of sub-frames between transmit and receive. The UL sub-frames and/or the DL sub-frames may be contiguous. Additionally, the first information may be based on power limitations of the UE.

In some embodiments, the UE is configured to transmit first information to the base station indicating that the UE is in a first power state. The first power state may or may not be a power limited state. The UE may receive a first sub-frame allocation based on at least the first information from the base station and may operate according to the first sub-frame allocation. Additionally, the UE may transmit second information to the base station indicating that the UE is in, or will be in, a second power state that is different from the first power state. The UE may then receive a second sub-frame allocation, different than the first sub-frame allocation and may operate according to the second sub-frame allocation.

In some embodiments, the UE is configured to operate according to a first transmit duty cycle. The first transmit duty cycle may specify a first number of transmissions per time period. The UE may monitor one or more metrics associated with transmission performance of the UE and determine that at least one metric of the one or more metrics indicates that the UE needs to reduce transmissions. Additionally, the UE may determine a second transmit duty cycle and operate according to the second transmit duty cycle. The second transmit duty cycle may specify a second number of transmissions per time period and the second number is less than the first number.

In some embodiments, the UE is configured to operate in a first state associated with a first transmit duty cycle and monitor a plurality of metrics associated with transmission performance of the UE. The first transmit duty cycle may specify a first number of transmissions per time period. The UE may also determine that at least one metric of the plurality of metrics indicates that the UE needs to reduce transmissions per time period and switch, based on the determination, to a second state associated with a second transmit duty cycle. The second transmit duty cycle may specify a second number of transmissions per time period and may be less than the first number.

In some embodiments, the UE is configured to detect that the UE is transmitting according to a first transmit duty cycle and determine an occurrence of at least one condition. Additionally, the UE may switch the UE to a second transmit duty cycle in response to the determination. The first transmit duty cycle may specify a first number of transmissions per time period and the second transmit duty cycle may specify a second number of transmissions per time period. The second number may be less than the first number. In addition, the occurrence may indicate that the UE needs to reduce transmissions per time period This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 14A-14C illustrate sub-frame allocations and ACK/NAK association sets according to the prior art.

FIGS. 15A-15D illustrate TDD sub-frame allocations according to some embodiments.

Figure 1:
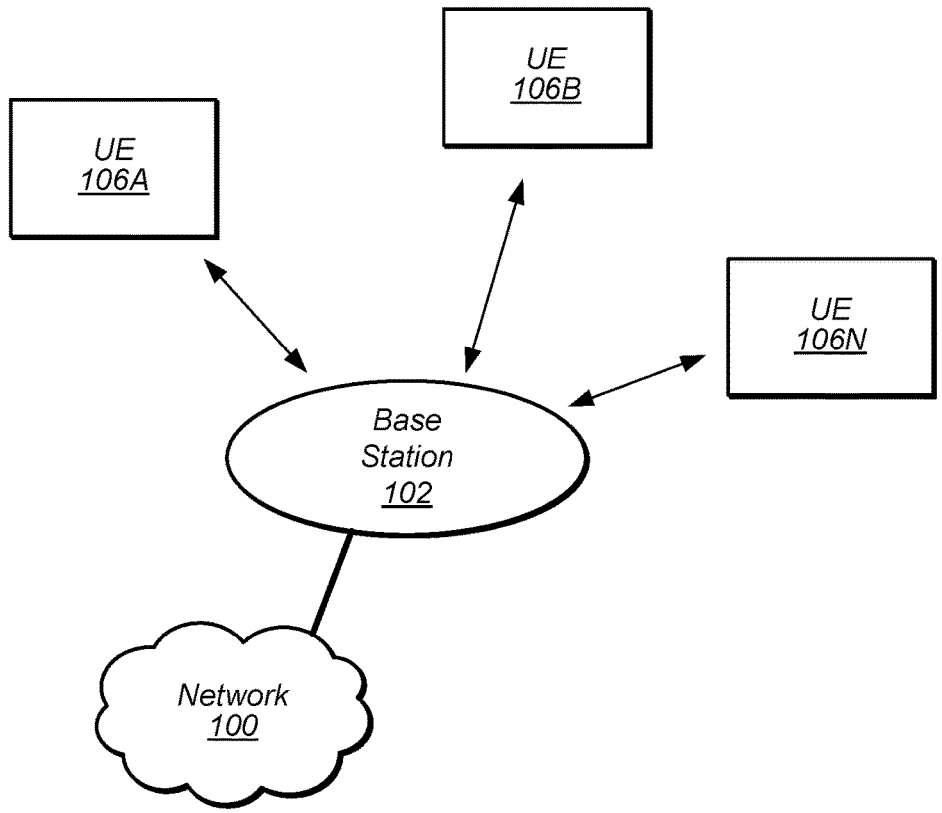
FIG. 1 illustrates an exemplary wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors or processing elements.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor or processing element that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates a wireless cellular communication system, according to some embodiments. It is noted that FIG. 1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
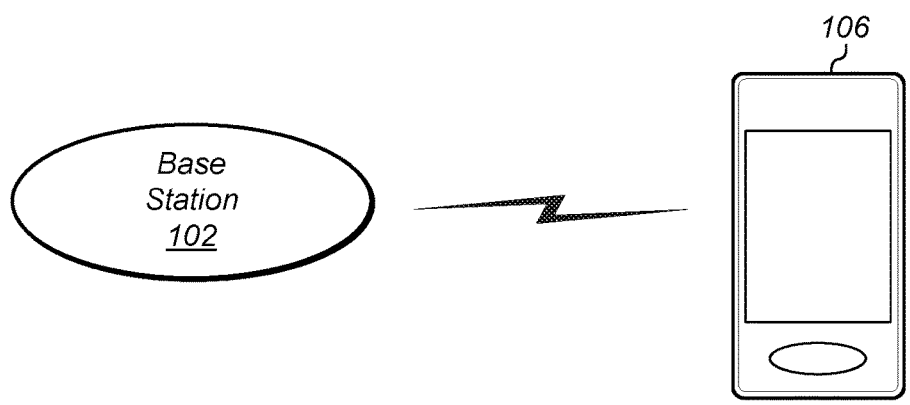
FIG. 2 illustrates a base station ("BS", or in the context of LTE, an "eNodeB" or "eNB") in communication with a wireless device, according to some embodiments.

FIG. 2 illustrates UE device 106 (e.g., one of the devices 106A through 106N) in communication with base station 102. The UE device 106 may have cellular communication capability, and as described above, may be a device such as a mobile phone, a hand-held device, a media player, a computer, a laptop or a tablet, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1xRTT (or LTE or GSM), and separate radios for communicating using each of Wi-Fi and Bluetooth. Other configurations are also possible.

Figure 3:
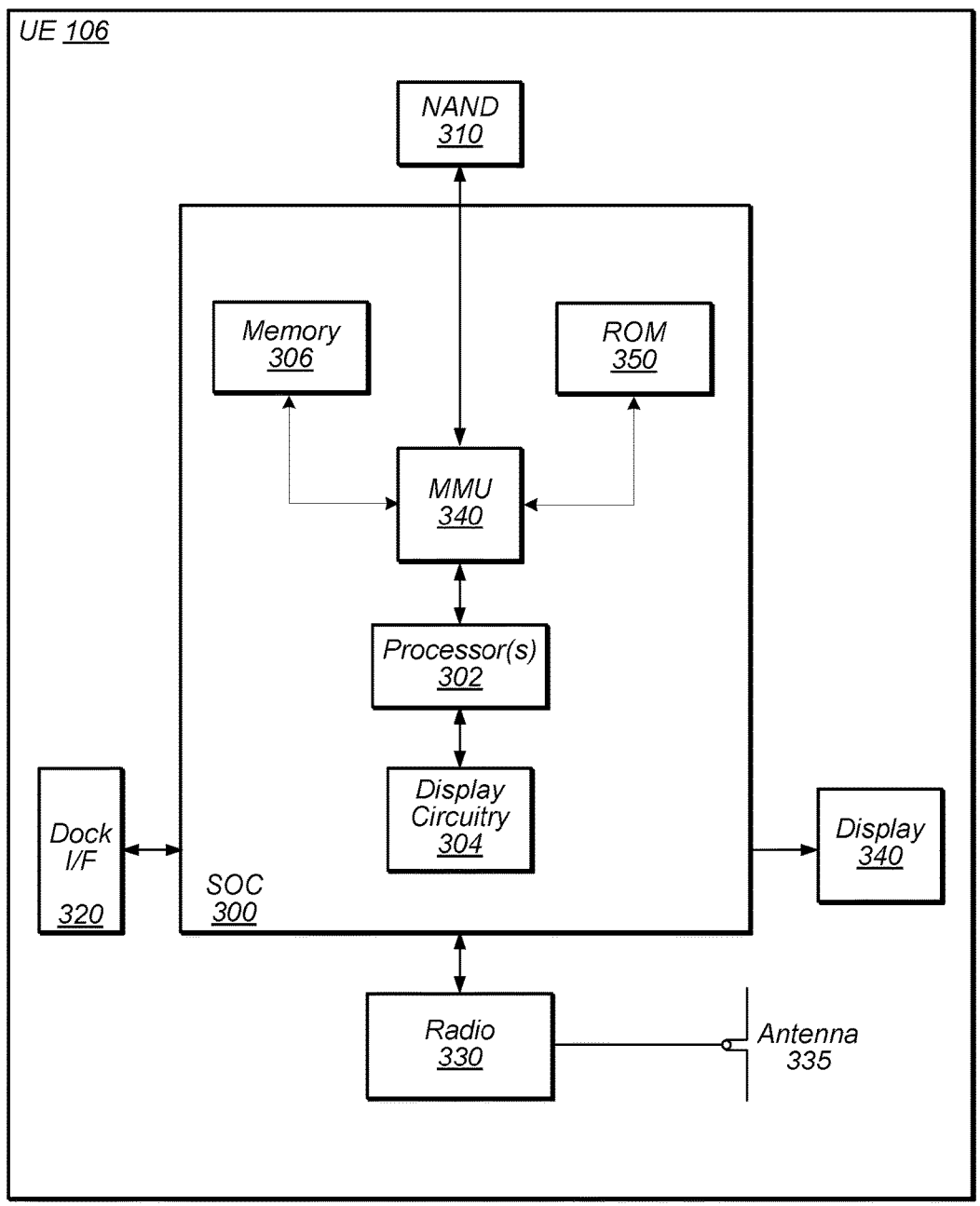
FIG. 3 illustrates a block diagram for one possible implementation of a wireless communication system, according to some embodiments.

FIG. 3—Example Block Diagram of a UE

FIG. 3 illustrates one possible block diagram of a UE 106. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 340.

In some embodiments, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 340, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing a method for responding to enhanced paging according to embodiments of this disclosure.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
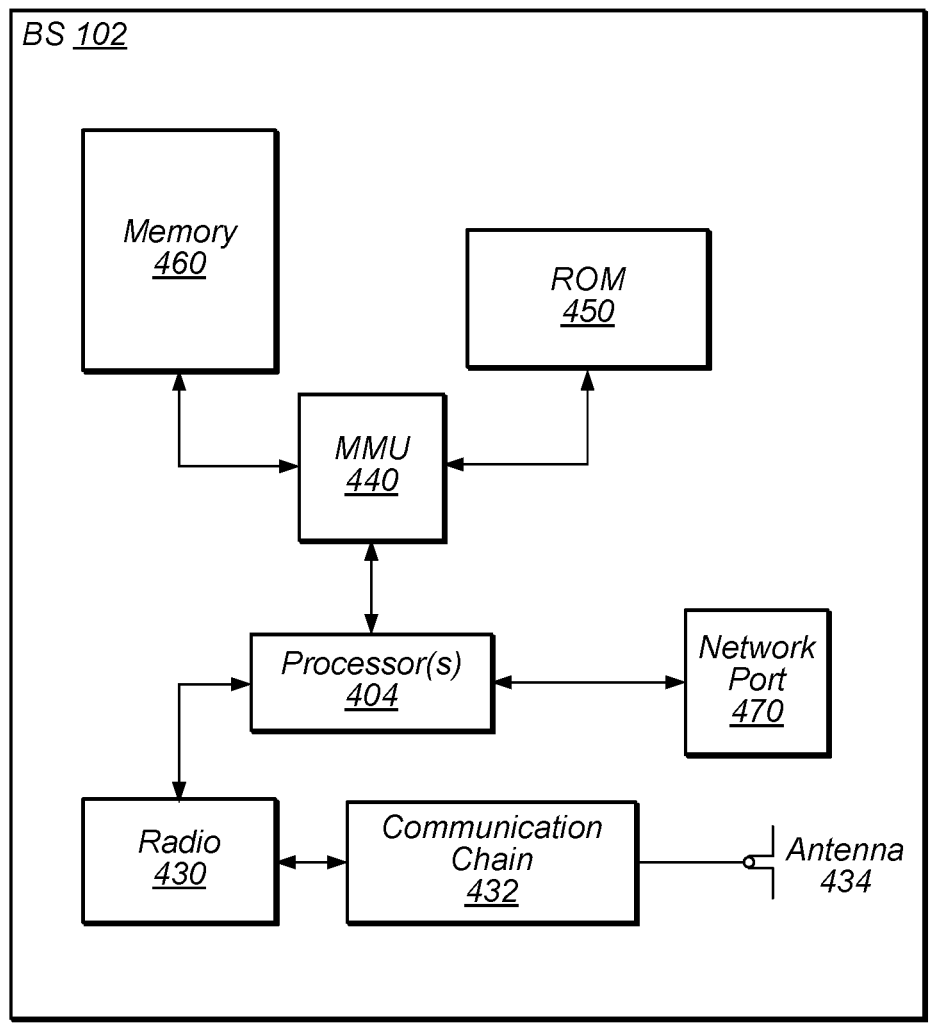
FIG. 4 illustrates a block diagram for one possible embodiment of a base station, according to some embodiments.

FIG. 4—Base Station

FIG. 4 illustrates a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Channels in LTE

LTE uses various channels so that data can be transported across the LTE radio interface. These channels are used to segregate the different types of data and allow them to be transported across the radio access network in an orderly fashion. The different channels effectively provide interfaces to the higher layers within the LTE protocol structure, and enable an orderly and defined segregation of the data.

There are three categories or types of LTE data channels as follows.

Physical channels: These are transmission channels that carry user data and control messages.

Transport channels: The physical layer transport channels offer information transfer to Medium Access Control (MAC) and higher layers.

Logical channels: Provide services for the Medium Access Control (MAC) layer within the LTE protocol structure.

LTE defines a number of physical downlink channels to carry information from the base station to the UE. The LTE downlink comprises a physical downlink shared channel (PDSCH) and a physical downlink control channel (PDCCH). The PDSCH is the downlink channel that carries all user data and all signaling messages. The PDSCH is the main data bearing channel which is allocated to users on a dynamic and opportunistic basis. The PDCCH carries the layer one control for the shared channel. Thus, the PDSCH is the key channel for communicating information to the UE, and the PDCCH communicates metadata for the information, e.g., "who" the data is for, "what" data is sent, and "how" the data is sent over the air in the PDSCH.

LTE also defines a number of physical uplink channels to carry information from the UE to the base station. The LTE uplink comprises a physical uplink shared channel (PUSCH) and a physical uplink control channel (PUCCH). The PUSCH is the uplink counterpart to the PDSCH. The PUCCH provides the various control signaling requirements for uplink communications. For example, the PUCCH is used for DL acknowledge/not acknowledge (ACK/NACK). Additionally, the PUCCH is used for periodically transmission of DL channel quality index (CQI), scheduling requests (SR), and sounding reference signals (SRS).

As described above, in LTE the base station (eNB) assigns UL resources using the PDCCH, wherein this assignment of resources is called a UL grant. The UL grant may be a type of persistent UL grant such as a semi-persistent scheduling (SPS) UL grant. The persistent or semi-persistent UL grant may be configured by radio resource control (RRC) layer signaling and the UE may be configured with SPS by the base station, and then the base station may activate the UE to use SPS. Persistent or semi-persistent UL grants, such as SPS, allows for a persistent, periodic UL grant. Thus, the UE may transmit new information periodically without receiving a new UL grant for each transmission. Alternatively, the UL grant may be for a specified amount of information, and the base station may send additional UL grants based on scheduling requests from the UE.

Figure 5:
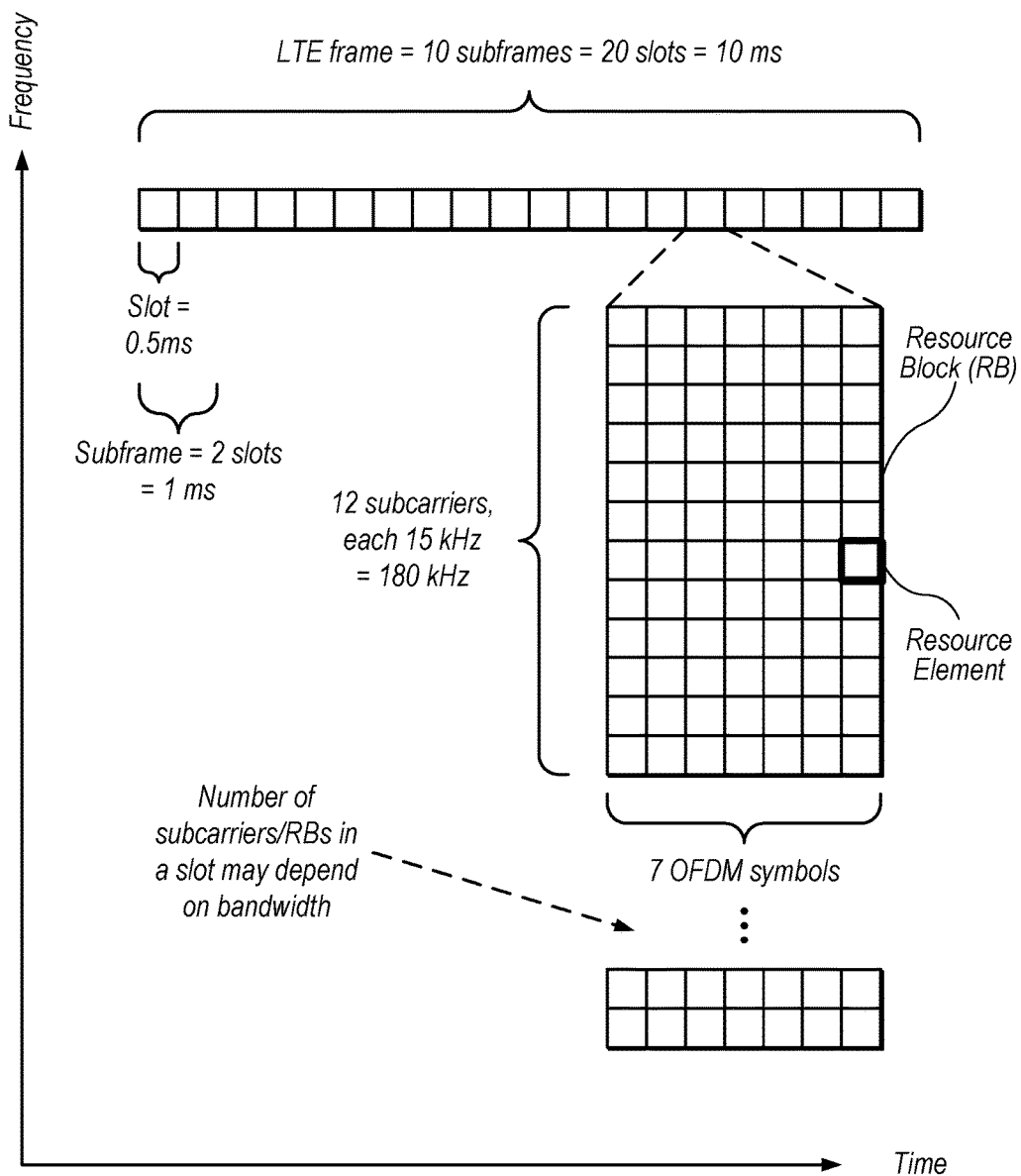
FIG. 5 illustrates a diagram that shows an exemplary LTE frame, according to some embodiments.

FIG. 5—Example LTE Frame

Various embodiments disclosed herein may utilize LTE frames and/or variations thereof. FIG. 5 shows a diagram illustrating one example of an LTE radio frame. As illustrated, each LTE frame covers 10 ms in the time dimension and multiple subcarriers in the frequency dimension (the number of subcarriers may depend on available bandwidth). Each frame includes 10 sub-frames which each include two slots and each slot includes one or more resource blocks (RBs) that in turn comprise a 7×12 array of seven orthogonal frequency-division multiplexing (OFDM) symbols by 12 subcarriers. As shown, the number of subcarriers/RBs in a slot may depend on bandwidth. Typically, a block corresponding to a particular symbol and subcarrier is referred to as a "resource element."

Time Multiplexing Radio Resources

Embodiments disclosed herein relate to techniques wherein multiple low power devices may time share radio resources on a radio access network (RAN), such as an LTE network.

Low power devices may include relatively limited power amplifiers. For example, when transmitting at high power, the power amplifiers in these devices may need time to re-charge before transmitting again. This may be especially true in low power conditions. But, high power transmissions may be needed for effective communication in poor radio conditions. If a given base station is serving multiple such low power devices, it may result in inefficient use of radio resources (e.g., because one or more low power devices are only using their resources part of the time and recharging at other times).

In some embodiments, radio resources in the time dimension (e.g., LTE sub-frames) are allocated among one or more low power devices. In some embodiments, sub-frames are allocated to UEs based on their power limitations and/or operating conditions, which a UE may be configured to specify, e.g., using a set of rules. UEs may be configured to specify this information at various granularities, ranging from a single bit to larger fields with detailed information. These techniques may improve signal strength and allow efficient use of network capacity, in some embodiments, while allowing devices to communicate in low-power and/or poor radio quality conditions. These techniques may allow sub-frame-allocated UEs to co-exist on the network with UEs with unlimited sub-frame allocation, in some embodiments.

Figure 6A:
FIGS. 6A-6C illustrate exemplary frame configurations and sub-frame allocations, according to some embodiments.
Figure 6A:

FIG. 6A shows a frame for LTE frame type 2, configuration 1 and an example sub-frame allocation for configuration 1. Time division duplex LTE (TD-LTE or LTE TDD) implementations currently use seven different configurations for type 2 LTE frames (FIG. 6B, described in further detail below, illustrates configuration 3). As illustrated, configuration 1 includes four sub-frames for downlink (DL or D), four sub-frames for uplink (UL or U), and two special sub-frames (S). The special sub-frames may allow a guard period when switching from DL to UL. The different type 2 configurations for LTE TDD may allow dynamic adjustment of the ratio between resources allocated to downlink and uplink by switching between configurations. For example, configuration 3 shown in FIG. 6B includes three UL sub-frames and five DL sub-frames which may be useful for DL-heavy workloads.

The example sub-frame allocation includes one UL sub-frame and three DL sub-frames, allocated to a particular UE. The unused sub-frames (the first, second, fourth, fifth, eighth and ninth sub-frames in the illustrated example) may be allocated to a second UE or to multiple additional UEs.

The example sub-frame allocation of FIG. 6A may be assigned to the UE based on a request for a sub-frame allocation, which may include one or more rules for allocating sub-frames. The base station may select sub-frames to allocate to the UE (e.g., based on the one or more rules and based on sub-frames allocated to other UEs) and transmit the allocation to the UE. In some embodiments, a UE may request a sub-frame allocation based on a particular DL/UL ratio, current power conditions, and/or current radio conditions. For example, in low power and/or poor radio conditions, a UE may request a large transmit/receive duty cycle such as one transmit and one receive sub-frame in half duplex mode every frame. In better power and/or radio conditions, the UE may request a small duty cycle or no duty cycle and full duplex mode (if utilizing frequency division, discussed below). In some embodiments, UEs in certain operating conditions may request a full, unlimited sub-frame allocation rather than allocation of a portion of sub-frames. Thus, a given UE may switch between limited and unlimited sub-frame configurations in some embodiments.

In other embodiments, the UE may be configured to request allocation of a particular set of sub-frames from the base station. However, these embodiments may be less efficient as they may not allow the base station as much flexibility in allocating sub-frames among different UEs. Thus, in many embodiments, a UE may simply request allocation of a portion of sub-frames within a frame without requesting particular sub-frames. Said another way, a request may be for any subset of sub-frames that is to be granted based on one or more rules, such as a desired number of DL and UL sub-frames. In various embodiments, the base station is configured to communicate with multiple UEs using a given LTE frame, using sub-frames allocated to the different UEs.

According to some embodiments, sub-frame allocation is shown as being performed among sub-frames within a frame. In other embodiments, allocation may be performed among sub-frames within a half-frame or among sub-frames within multiple frames.

Figure 6B:
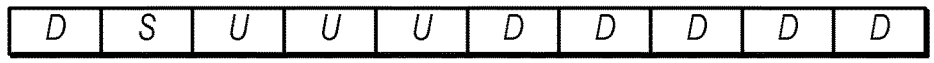
Figure 6B:

FIG. 6B shows a frame for LTE frame type 2, configuration 3 and an example sub-frame allocation for configuration 3. As illustrated, configuration 3 allows greater DL throughput than UL throughput. In some embodiments, a UE may request a particular configuration and/or sub-frame allocation based on desired DL and/or UL bandwidth for a particular workload. Configurations 1 and 3 are shown for exemplary purposes, but any of various currently-available or future configurations may be used in various embodiments.

Figure 6C:
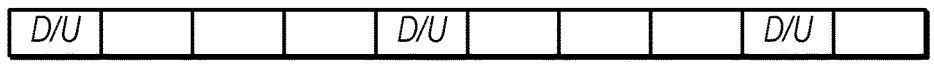
Figure 6C:
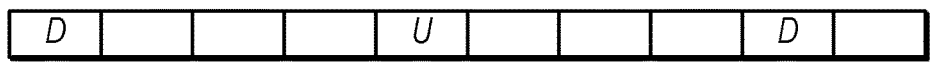

FIG. 6C shows an exemplary full-duplex allocation in which sub-frames assigned to a UE are used for both DL and UL, e.g., by sharing frequency resources. Full-duplex transmission may be used with frequency division duplexing (FDD) LTE. Speaking generally, the sub-frame allocation techniques disclosed herein may be used in LTE FDD and/or LTE TDD. In some embodiments, the UE is configured to request either half-duplex or full-duplex allocation. For example, even when FDD is available, a UE may request a half-duplex allocation in poor radio conditions, e.g., as shown in the example of half-duplex allocation of FDD of FIG. 6C. A given UE may be configured to communicate using half-duplex, full-duplex, or both (e.g., in different modes). Half-duplex communication may reduce insertion loss relative to full-duplex implementations, e.g., by using a pair of switched transmit and receive filters instead of a duplex filter.

In some embodiments, UEs may request sub-frame allocation using radio resource control (RRC) messages. In some embodiments, RRC messages are extended to include one or more fields for requesting sub-frame allocation. RRC messages may be advantageous because they benefit from LTE radio layer two retransmission, increasing reliability. However, setup using RRC may take 50-100 ms to complete in some embodiments.

In other embodiments, UEs may request sub-frame allocation using control elements of media access control (MAC) protocol data units (PDU). Using MAC PDU control elements may allow for improved setup speed relative to using RRC, but may not be as reliable as RRC.

In still other embodiments, other techniques and/or fields may be used to request and/or confirm/deny sub-frame allocation in addition to and/or in place of RRC message and MAC PDU control elements.

In some embodiments, hybrid automatic repeat request (HARQ) techniques may be applied after sub-frame allocation. In LTE FDD implementations, a HARQ ACK/NACK indication for a given DL or UL sub-frame is typically transmitted four sub-frames later. However, sub-frame allocation may result in varying distances between sub-frames for a given UE. Therefore, in some embodiments, a DL ACK/NACK is transmitted on the first UL sub-frame N>=n+4 where n is the sub-frame in which corresponding DL data is transmitted. In these embodiments, an UL ACK/NACK is transmitted in the first DL sub-frame N>=n+4 where n is the sub-frame in which corresponding UL data is transmitted. In these embodiments, UL data is transmitted on the first sub-frame N>=n+4 where n is the DL sub-frame that includes the UL grant. HARQ retransmission based on sub-frame allocation may improve DL and UL decoding reliability, e.g., for low power LTE devices with limited RF range.

Figure 7A:
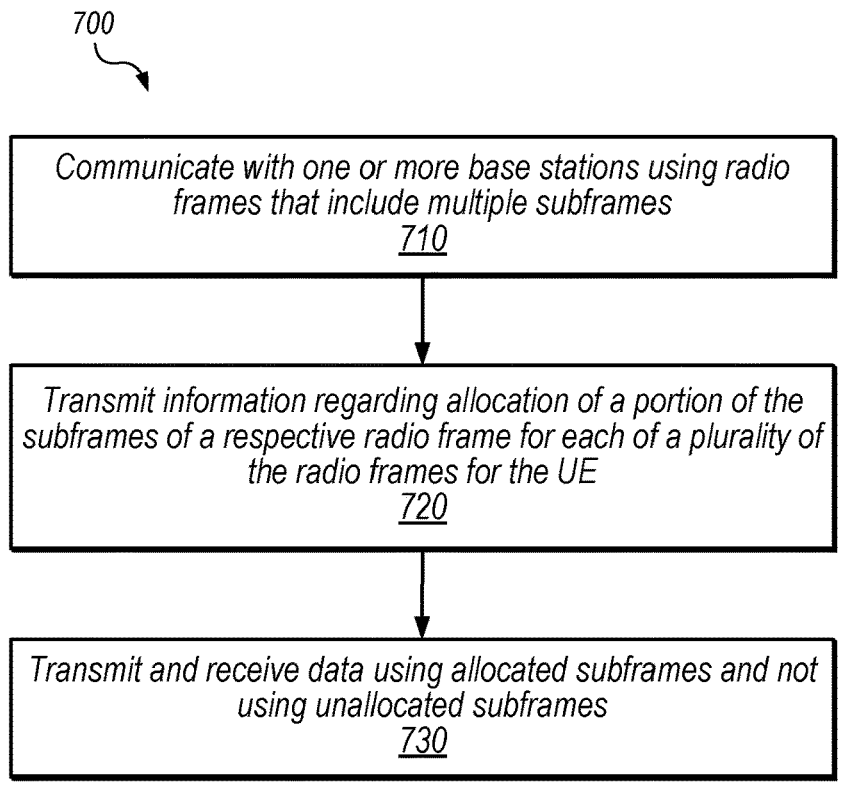
FIG. 7A illustrates a method for radio resource time multiplexing, according to some embodiments.

FIG. 7A shows flow diagram illustrating a method 700 for time multiplexing, according to some embodiments. The method shown in FIG. 7A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, a UE communicates with one or more base stations using radio frames that include multiple sub-frames. For example, in some embodiments, the radio frames are LTE frames. Flow proceeds to block 720.

At block 720, the UE transmits information regarding allocation of a portion of the sub-frames of a respective radio frame for each of a plurality of the radio frames for the UE. For example, the UE may specify a set of one or more rules associated with power limitations and/or operating conditions and the base station may select sub-frames that at least partially satisfy the rules. Flow proceeds to block 730.

At block 730, the UE transmits and receives data using allocated sub-frames and not using unallocated sub-frames. In some embodiments, an base station indicates allocated sub-frames to the UE prior to block 730, e.g., by selecting sub-frames and allocating the sub-frames to the UE based on information received from the UE and/or based on sub-frames allocated to one or more other UEs. In various embodiments, the base station is configured to allocate unallocated sub-frames to other UEs. In some embodiments, the UE is configured to communicate using the allocated sub-frames until communication is terminated or a request for a different allocation is sent. Flow ends at block 730.

Figure 7B:
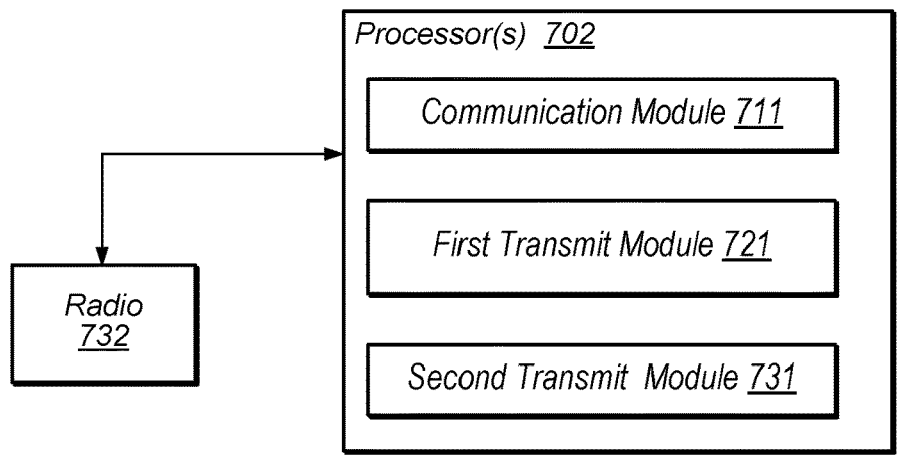
FIG. 7B illustrates a processor including modules for radio resource time multiplexing, according to some embodiments.

FIG. 7B illustrates a processor including modules for time multiplexing, according to some embodiments. In some embodiments, radio 732 (which may be equivalent to radio 330 described above) may be coupled to processor 702 (which may be equivalent to processor(s) 302 described above). The processor may be configured to perform the method described above in reference to FIG. 7A. In some embodiments, processor 702 may include one or more modules, such as modules 711-731, and the modules may be configured to perform various steps of the method described above in reference to FIG. 7A. As shown, the modules may be configured as follows.

In some embodiments, processor 702 may include a communication module 711 configured to communicate (e.g., via radio 732) with one or more base stations using radio frames that include multiple sub-frames. For example, in some embodiments, the radio frames are LTE frames.

In addition, processor 702 may include a first transmit module 721 configured to transmit (e.g., via radio 732) information regarding allocation of a portion of the sub-frames of a respective radio frame for each of a plurality of the radio frames for the UE. For example, the UE may specify a set of one or more rules associated with power limitations and/or operating conditions and the base station may select sub-frames that at least partially satisfy the rules.

Further, processor 702 may include a second transmit module 731 configured to transmit and receive data (e.g., via radio 732) using allocated sub-frames and not using unallocated sub-frames. In some embodiments, an base station may indicate allocated sub-frames to the UE prior to block 730, e.g., by selecting sub-frames and allocating the sub-frames to the UE based on information received from the UE and/or based on sub-frames allocated to one or more other UEs. In various embodiments, the base station may be configured to allocate unallocated sub-frames to other UEs. In some embodiments, the UE may be configured to communicate, via second transmit module 731, using the allocated sub-frames until communication is terminated or a request for a different allocation is sent.

It is apparent for those skilled in the art that, for the particular processes of the modules described above (such as modules 711, 721, and 731), reference may be made to the corresponding steps (such as steps 710, 720, and 730, respectively) in the related process embodiment sharing the same concept and the reference is regarded as the disclosure of the related modules as well. Furthermore, processor 702 may be implemented in software, hardware or combination thereof. More specifically, processor 702 may be implemented as a processing element, which includes, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processor 702 may be implemented as a general-purpose processor such as a CPU, and therefore each module can be implemented with the CPU executing instructions stored in a memory which perform a respective step.

Sub-Frame Allocation

Figure 8A:
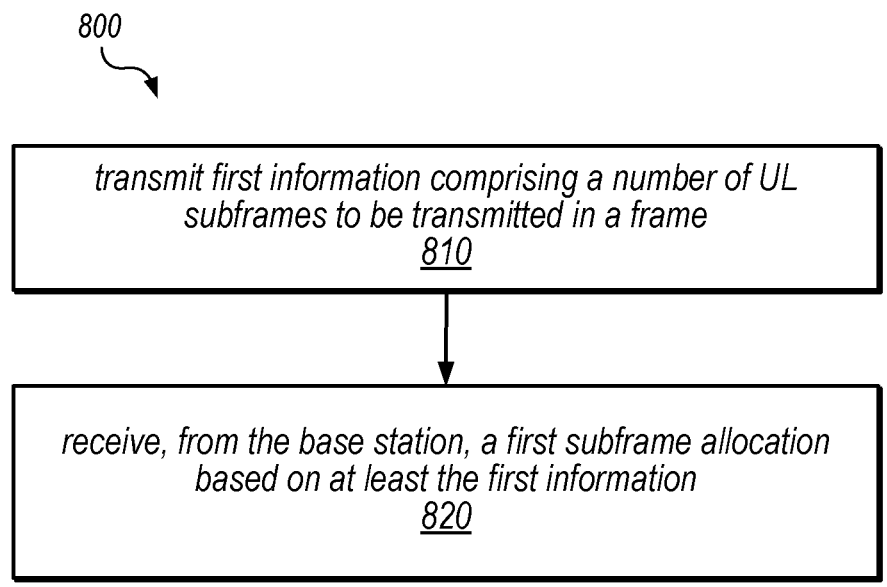
FIG. 8A illustrates a method for sub-frame allocation, according to some embodiments.

As disclosed above, sub-frames may be allocated among multiple UEs. Thus, low power devices may share resources within a frame. As noted, the techniques disclosed above may allow sub-frame allocated UEs to co-exist on the network with UEs with unlimited sub-frame allocation. FIG. 8A shows a flow diagram illustration of a method 800 for determining a sub-frame allocation, according to some embodiments. The method shown in FIG. 8 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. As shown, the method may be performed as follows.

At 810, a UE may transmit first information to a base station. The first information may include a number of uplink (UL) sub-frames to be transmitted in a frame. The UL sub-frames may be contiguous. The first information may also include a number of downlink (DL) sub-frames to be received in a frame and the DL sub-frames may be contiguous. Additionally, the information may include a minimum number of sub-frames between transmit and receive. In other words, the information may include the number of sub-frames required by the UE between UL and DL communications.

The first information may be generated based on power limitations of the UE. Thus, the first information may be based on a power duty cycle of the UE. Further, in some embodiments, the first information may be indicated in a field of a radio resource control (RRC) connection setup message.

In some embodiments, the UE may transmit second information to the base station. The second information may indicate that the UE may transmit in all UL sub-frames and receive in all DL sub-frames. In other words, the second information may indicate that the UE may operate according to an unlimited sub-frame allocation. Additionally, the second information may be indicated in a field of a RRC connection setup message.

In certain embodiments, the UE may transmit third information to the base station. The third information may indicate that the UE may transmit in only half duplex for frequency division duplexing (FDD).

In some embodiments, the first information may be transmitted as a random access channel (RACH) preamble sequence. Thus, the first information may be determined based on the RACH preamble sequence. Further, the sub-frame locations of the RACH preamble sequence may be used to determine the first information.

The RACH preamble sequence may be defined based on the first information. In other words, values of the first information may be standardized and used to define the RACH preamble sequence. Thus, when the base station receives a RACH preamble sequence, the base station may determine the sub-frame allocation based on the standardized values of first information. In such embodiments, the base station may combine received signals from defined RACH sub-frames to detect a RACH attempt from the UE. From the perspective of the UE, each preamble attempt may belong to the same RACH procedure, including msg1 and msg2. Note that is some embodiments, each preamble may require additional power from the UE and may be referred to as a power-ramped preamble. Additionally, RACH msg3 and msg4, which are transmitted and received using HARQ with a temporary C-RNTI (cell radio network temporary identity), should follow the sub-frame allocation implied from the RACH configuration used by the UE for random access.

Further, when the first information is transmitted via the RACH preamble sequence, the UE may also transmit an RRC connection setup message including the first information. Additionally the RRC connection setup message may include the second information. Once the UE has attached to the base station (e.g., after RRC connection is setup), the first information may be stored in the base station. Additionally, the UE may send second information, relating to a different sub-frame allocation and the second information may also be stored in the base station.

At 820, the UE may receive a first sub-frame allocation based on at least the first information. The sub-frame allocation may be received in an RRC message. In some embodiments, the sub-frame allocation may be received in a MAC control element as part of a DL MAC PDU. The allocation may be based on the availability of sub-frames that have not been allocated to other UEs. In embodiments in which the UE transmits second information indicating that the UE can transmit in all UL sub-frames and all DL sub-frames, the UE may receive a second allocation based on at least the second information.

In certain embodiments, the first sub-frame allocation may also configure the periodicity and start location of at least one of the CQI, the SR, and the SRS to align with the first sub-frame allocation. In some embodiments, the UE may receive the configuration of the CQI/SR/SRS in an RRC reconfigure message from the base station. Note that in certain embodiments, the existing CQI/SR/SRS periodicity configuration on PUCCH may be a multiple of the sub-frame allocation duty cycle. Thus, the CQI/SR/SRS periodicity does not need to be reconfigured and the CQI/SR/SRS transmission start location may be aligned, in some instances automatically, to the closest UL sub-frame in the sub-frame allocation.

In some embodiments, the UE's sub-frame allocation may be reconfigured based on network traffic. In other words, to better utilize radio resources, the UE may receive a new sub-frame allocation. The new sub-frame allocation may comply with the first information, but may modify the location of the first UL or first DL within the sub-frame.

Figure 8B:
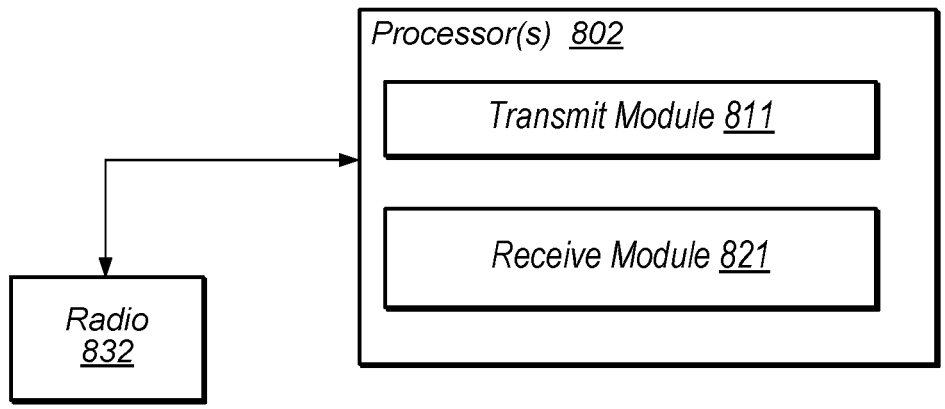
FIG. 8B illustrates a processor including modules for sub-frame allocation, according to some embodiments.

FIG. 8B illustrates a processor including modules for determining a sub-frame allocation, according to some embodiments. In some embodiments, radio 832 (which may be equivalent to radio 330 described above) may be coupled to processor 802 (which may be equivalent to processor(s) 302 described above). The processor may be configured to perform the method described above in reference to FIG. 8A. In some embodiments, processor 802 may include one or more modules, such as modules 811-821, and the modules may be configured to perform various steps of the method described above in reference to FIG. 8A. As shown, the modules may be configured as follows.

In some embodiments, processor 802 may include a transmit module 811 configured to may transmit first information to a base station (e.g., via radio 832). The first information may include a number of uplink (UL) sub-frames to be transmitted in a frame. The UL sub-frames may be contiguous. The first information may also include a number of downlink (DL) sub-frames to be received in a frame and the DL sub-frames may be contiguous. Additionally, the information may include a minimum number of sub-frames between transmit and receive. In other words, the information may include the number of sub-frames required by the UE between UL and DL communications.

The first information may be generated based on power limitations of the UE. Thus, the first information may be based on a power duty cycle of the UE. Further, in some embodiments, the first information may be indicated in a field of a radio resource control (RRC) connection setup message.

In some embodiments, transmit module 811 may be further configured to transmit second information to the base station. The second information may indicate that the UE may transmit in all UL sub-frames and receive in all DL sub-frames. In other words, the second information may indicate that the UE may operate according to an unlimited sub-frame allocation. Additionally, the second information may be indicated in a field of a RRC connection setup message.

In certain embodiments, transmit module 811 may be further configured to transmit third information to the base station. The third information may indicate that the UE may transmit in only half duplex for frequency division duplexing (FDD).

In some embodiments, the first information may be transmitted as a random access channel (RACH) preamble sequence. Thus, the first information may be determined based on the RACH preamble sequence. Further, the sub-frame locations of the RACH preamble sequence may be used to determine the first information.

The RACH preamble sequence may be defined based on the first information. In other words, values of the first information may be standardized and used to define the RACH preamble sequence. Thus, when the base station receives a RACH preamble sequence, the base station may determine the sub-frame allocation based on the standardized values of first information. In such embodiments, the base station may combine received signals from defined RACH sub-frames to detect a RACH attempt from the UE. From the perspective of the UE, each preamble attempt may belong to the same RACH procedure, including msg1 and msg2. Note that is some embodiments, each preamble may require additional power from the UE and may be referred to as a power-ramped preamble. Additionally, RACH msg3 and msg4, which are transmitted and received using HARQ with a temporary C-RNTI (cell radio network temporary identity), should follow the sub-frame allocation implied from the RACH configuration used by the UE for random access.

Further, when the first information is transmitted via the RACH preamble sequence, the UE may also transmit an RRC connection setup message including the first information. Additionally the RRC connection setup message may include the second information. Once the UE has attached to the base station (e.g., after RRC connection is setup), the first information may be stored in the base station. Additionally, the UE may send second information, relating to a different sub-frame allocation and the second information may also be stored in the base station.

In addition, processor 820 may include a receive module 821 configured to receive (e.g., via radio 832) a first sub-frame allocation based on at least the first information. The sub-frame allocation may be received in an RRC message. In some embodiments, the sub-frame allocation may be received in a MAC control element (CE) as part of a DL MAC PDU. The allocation may be based on the availability of sub-frames that have not been allocated to other UEs. In embodiments in which the UE transmits second information indicating that the UE can transmit in all UL sub-frames and all DL sub-frames, the UE may receive a second allocation based on at least the second information.

In certain embodiments, the first sub-frame allocation may also configure the periodicity and start location of at least one of the CQI, the SR, and the SRS to align with the first sub-frame allocation. In some embodiments, the UE may receive the configuration of the CQI/SR/SRS in an RRC reconfigure message from the base station. Note that in certain embodiments, the existing CQI/SR/SRS periodicity configuration on PUCCH may be a multiple of the sub-frame allocation duty cycle. Thus, the CQI/SR/SRS periodicity does not need to be reconfigured and the CQI/SR/SRS transmission start location may be aligned, in some instances automatically, to the closest UL sub-frame in the sub-frame allocation.

In some embodiments, the UE's sub-frame allocation may be reconfigured based on network traffic. In other words, to better utilize radio resources, the UE may receive a new sub-frame allocation. The new sub-frame allocation may comply with the first information, but may modify the location of the first UL or first DL within the sub-frame.

It is apparent for those skilled in the art that, for the particular processes of the modules described above (such as modules 811 and 821), reference may be made to the corresponding steps (such as steps 810 and 820, respectively) in the related process embodiment sharing the same concept and the reference is regarded as the disclosure of the related modules as well. Furthermore, processor 802 may be implemented in software, hardware or combination thereof. More specifically, processor 802 may be implemented as a processing element, which includes, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processor 802 may be implemented as a general-purpose processor such as a CPU, and therefore each module can be implemented with the CPU executing instructions stored in a memory which perform a respective step.

Switching Between Frame Allocations

Figure 9A:
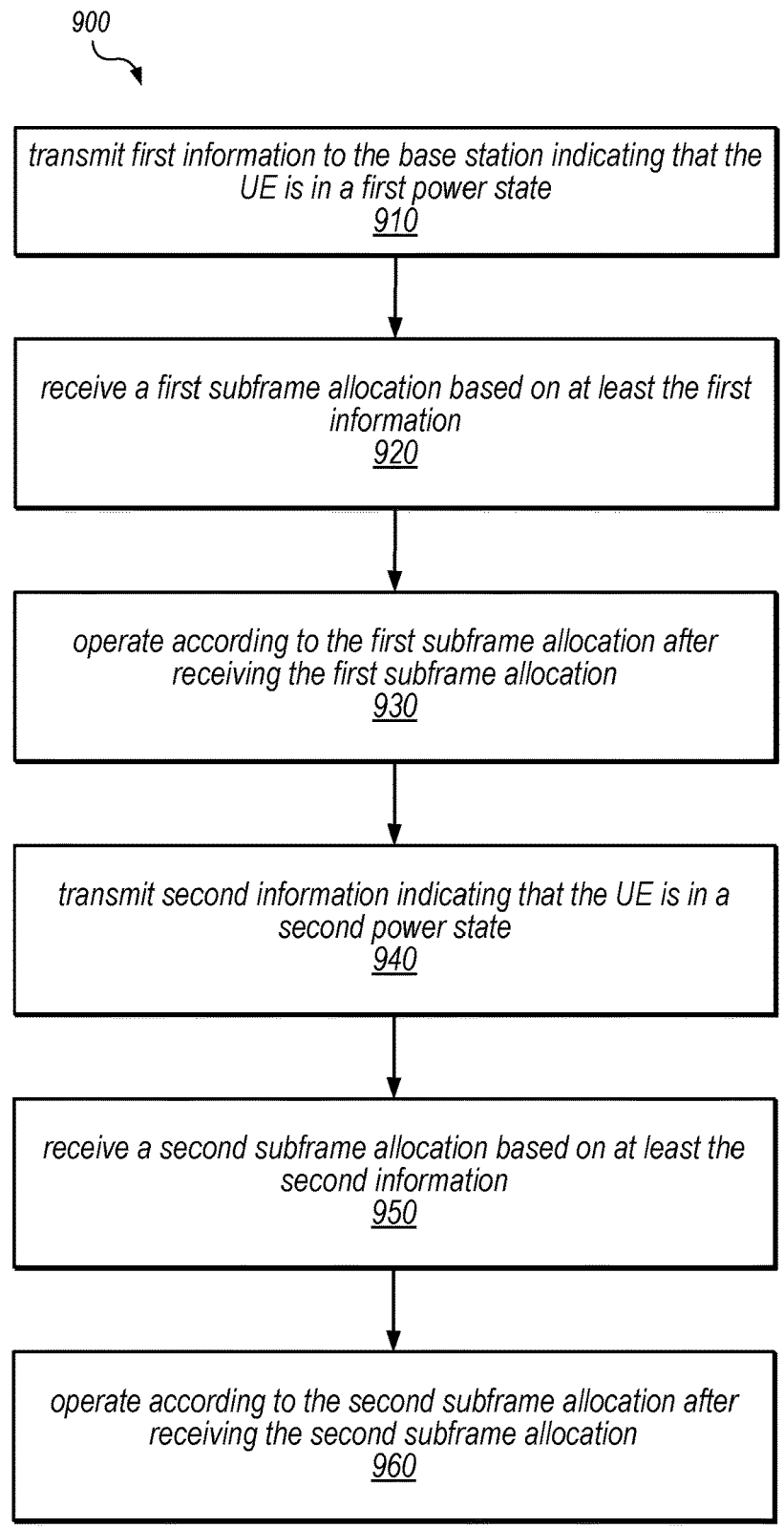
FIG. 9A illustrates a method for switching between frame allocations, according to some embodiments.

In various embodiments, it may be advantageous for a UE to switch between being a limited sub-frame allocated UE to a UE with unlimited sub-frame allocation. For example, when a UE is in a good radio condition and/or a low power condition (e.g., near a cell or base station) the UE may operate in a first power state (e.g., a not power limited state) and communicate according to a sub-frame allocation based on the first power state, whereas, when the UE enters a poor radio condition and/or high power condition, the UE may switch to operate in a second power state (e.g., in a state where power is restricted to be less than normal power) and communicate according to a sub-frame allocation based on the power limited state (e.g., a limited sub-frame allocation). FIG. 9A shows a flow diagram illustration of a method 900 for switching between frame allocations, according to some embodiments. The method shown in FIG. 9A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. As shown, the method 900 may be performed as follows.

At 910, the UE may transmit first information to the base station. The first information may indicate that the UE is in a first power state. The first power state may be a limited power state or may not be a limited power state. Note that when a UE is in a power state that is not a limited power state means that the power of the UE is restricted less than when the UE is in the limited power state. Thus, a limited power state means the UE is more power restricted than in another power state.

As described above, when the first power state is a limited power state, the first information may include one or more parameters such as a number of UL sub-frames the UE may transmit in a frame, a number of DL sub-frames the UE may transmit in a frame, and a number of sub-frames between the UL and DL sub-frames.

At 920, the UE may receive a first sub-frame allocation based on at least the first information. The first sub-frame allocation may indicate which sub-frames the UE may transmit and receive in. More particularly, when the first power state is a limited power state, the first sub-frame allocation may indicate the first UL sub-frame the UE may transmit in or the first DL sub-frame the UE may receive in. In addition, when the first power state is not a limited power state (e.g., the power of the UE is restricted less than in the limited power state) the first sub-frame allocation may indicate the UE is not limited as to which sub-frames the UE may transmit and receive on. The UE may receive the first sub-frame allocation in an RRC reconfigure message and/or in a MAC control element as part of a DL MAC PDU.

At 930, the UE may operate according to the first sub-frame allocation. In other words, the UE may communicate with the base station using the sub-frames allocated by the first sub-frame allocation. Thus the UE may transmit in the allocated UL sub-frame(s) and may receive in the allocated DL sub-frame(s).

At 940, the UE may transmit second information indicating that the UE is, or will be, in a second power state that is different from the first power state. The second power state may or may not be power limited. If the first power state was a power limited state, the UE may transmit the second information in a sub-frame that was not allocated to the UE. In such instances, the second information may be transmitted in a schedule request (SR) signal on the PUCCH. After transmitting the second information, the UE may listen on all DL sub-frames, including DL sub-frames not allocated to the UE. Further, the UE may receive an UL grant on a sub-frame not allocated to the UE.

Additionally, the UE may transmit the second information in an RRC message to the base station on a UL sub-frame allocated to the UE. Alternatively, the UE may transmit the second information in a medium access control (MAC) control element as part of a UL MAC packet data unit (PDU). Further, the UE may receive an UL grant on a sub-frame not allocated to the UE.

Further, when the first power state is not a limited power state, prior to transmitting the second information, the UE may determine that the current power has dropped below a threshold. Alternatively, or in addition to, the UE may determine that the current radio conditions are below a radio condition threshold. In some embodiments, the UE may determine that power needs to be conserved for a maximum peak power transmission in the near future prior to transmitting the second information. In other words, although the UE is currently not in a power limited state, the UE may send the second information so the UE may switch to a sub-frame allocation corresponding to a power limited state in order to conserve power for a future transmission.

At 950, the UE may receive a second sub-frame allocation based on at least the second information. As described above, when the first power state is a limited power state, the second sub-frame allocation may be received on a sub-frame not allocated to the UE. Further, the second allocation may not limit the UE to specified sub-frames. In other words, the UE may use all UL/DL sub-frames. The UE may receive the second sub-frame allocation in an RRC reconfigure message and/or in a MAC control element as part of a DL MAC PDU.

Additionally, when the first power state is not a limited power state, the second sub-frame allocation may indicate which sub-frames the UE may transmit and receive in. More particularly, the second sub-frame allocation may indicate the first UL sub-frame the UE may transmit in or the first DL sub-frame the UE may receive in.

At 960, the UE may operate according to the second sub-frame allocation. Thus, the UE may operate according to an unlimited allocation of sub-frames. In other words, the UE may communicate with the base station using the sub-frames allocated by the second sub-frame allocation.

In further embodiments, a UE may not be operating in a power limited state and transmit using a maximum peak. In response, the UE may switch to a power limited state.

However, due to a lack of power, the UE may be unable to currently transmit information to the base station indicating the power state of the UE. In such instances, the UE may not transmit for a specified number of sub-frames. The non-transmission for the specified number of sub-frames may be an indication of the low power state of the UE. Thus, the base station may determine that the UE is in a power limited state after the specified number of sub-frames has occurred without a transmission from the UE. The UE may then receive an RRC message containing a sub-frame allocation based on the low power state of the UE. The UE may then operate according to the sub-frame allocation received in the RRC message.

Figure 9B:
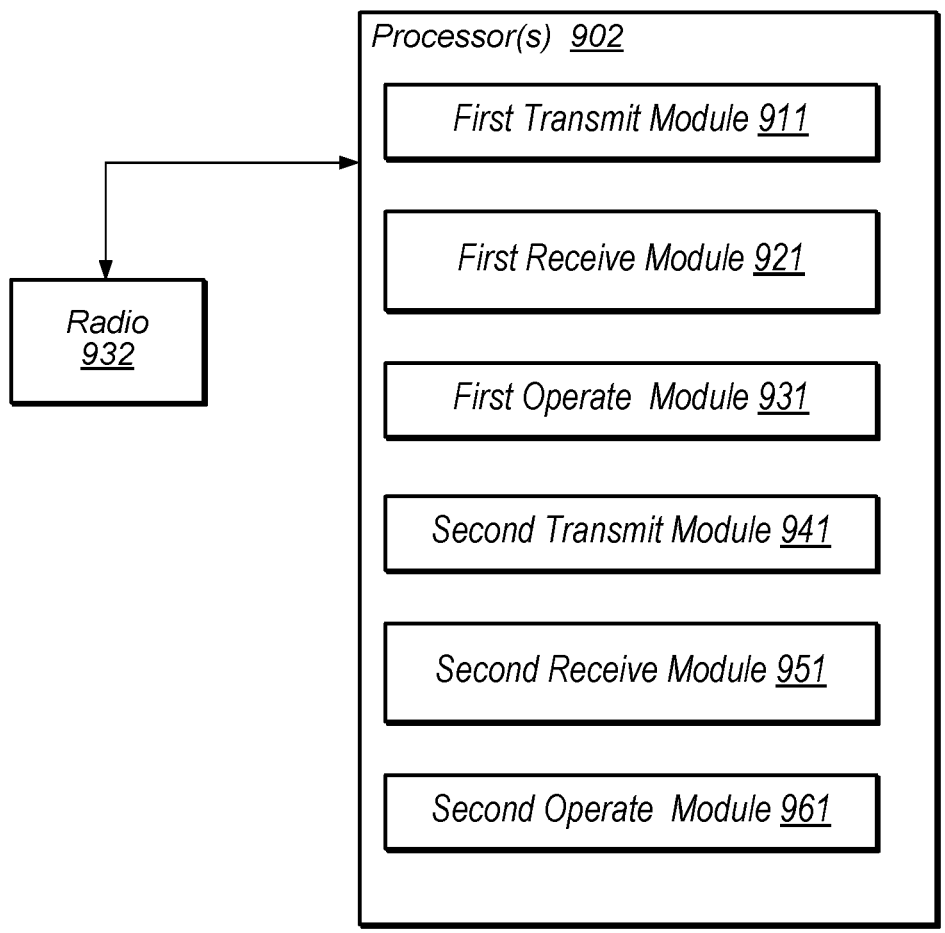
FIG. 9B illustrates a processor including modules for switching between frame allocations, according to some embodiments.

FIG. 9B illustrates a processor including modules for switching between frame allocations, according to some embodiments. In some embodiments, radio 932 (which may be equivalent to radio 330 described above) may be coupled to processor 902 (which may be equivalent to processor(s) 302 described above). The processor may be configured to perform the method described above in reference to FIG. 9A. In some embodiments, processor 902 may include one or more modules, such as modules 911-961, and the modules may be configured to perform various steps of the method described above in reference to FIG. 9A. As shown, the modules may be configured as follows.

In some embodiments, processor 902 may include a first transmit module configured to transmit (e.g., via radio 932) first information to the base station. The first information may indicate that the UE is in a first power state. The first power state may be a limited power state or may not be a limited power state. As described above, when the first power state is a limited power state, the first information may include one or more parameters such as a number of UL sub-frames the UE may transmit in a frame, a number of DL sub-frames the UE may transmit in a frame, and a number of sub-frames between the UL and DL sub-frames.

In addition, processor 902 may include a first receive module 921 configured to receive (e.g., via radio 932) a first sub-frame allocation based on at least the first information. The first sub-frame allocation may indicate which sub-frames the UE may transmit and receive in. More particularly, when the first power state is a limited power state, the first sub-frame allocation may indicate the first UL sub-frame the UE may transmit in or the first DL sub-frame the UE may receive in. In addition, when the first power state is not a limited power state (e.g., the power of the UE is restricted less than in the limited power state) the first sub-frame allocation may indicate the UE is not limited as to which sub-frames the UE may transmit and receive on. The UE may receive the first sub-frame allocation in an RRC reconfigure message and/or in a MAC CE as part of a DL MAC PDU.

Processor 902 may also include a first operate module 931 configured to operate the UE according to the first sub-frame allocation. In other words, the UE may communicate with the base station using the sub-frames allocated by the first sub-frame allocation. Thus the UE may transmit in the allocated UL sub-frame(s) and may receive in the allocated DL sub-frame(s).

Processor 902 may include a second transmit module 941 configured to transmit (e.g., via radio 932) second information indicating that the UE is, or will be, in a second power state that is different from the first power state. The second power state may or may not be power limited. If the first power state was a power limited state, the UE may transmit the second information in a sub-frame that was not allocated to the UE. In such instances, the second information may be transmitted in a schedule request (SR) signal on the PUCCH. After transmitting the second information, the UE may listen on all DL sub-frames, including DL sub-frames not allocated to the UE. Further, the UE may receive an UL grant on a sub-frame not allocated to the UE.

Additionally, the UE may transmit the second information in an RRC message to the base station on a UL sub-frame allocated to the UE. Alternatively, the UE may transmit the second information in a medium access control (MAC) control element as part of a UL MAC packet data unit (PDU). Further, the UE may receive an UL grant on a sub-frame not allocated to the UE.

Further, when the first power state is not a limited power state, prior to transmitting the second information, the UE may determine that the current power has dropped below a threshold. Alternatively, or in addition to, the UE may determine that the current radio conditions are below a radio condition threshold. In some embodiments, the UE may determine that power needs to be conserved for a maximum peak power transmission in the near future prior to transmitting the second information. In other words, although the UE is currently not in a power limited state, the UE may send the second information so the UE may switch to a sub-frame allocation corresponding to a power limited state in order to conserve power for a future transmission.

Additionally, processor 902 may include a second receive module 951 configured to receive (e.g., via radio 932) a second sub-frame allocation based on at least the second information. As described above, when the first power state is a limited power state, the second sub-frame allocation may be received on a sub-frame not allocated to the UE. Further, the second allocation may not limit the UE to specified sub-frames. In other words, the UE may use all UL/DL sub-frames. The UE may receive the second sub-frame allocation in an RRC reconfigure message and/or in a MAC control element as part of a DL MAC PDU.

Additionally, when the first power state is not a limited power state, the second sub-frame allocation may indicate which sub-frames the UE may transmit and receive in. More particularly, the second sub-frame allocation may indicate the first UL sub-frame the UE may transmit in or the first DL sub-frame the UE may receive in.

Processor 902 may also include a second operate module 961 configured to operate the UE according to the second sub-frame allocation. Thus, the UE may operate according to an unlimited allocation of sub-frames. In other words, the UE may communicate with the base station using the sub-frames allocated by the second sub-frame allocation.

In further embodiments, a UE may not be operating in a power limited state and transmit using a maximum peak. In response, the UE may switch to a power limited state. However, due to a lack of power, the UE may be unable to currently transmit information to the base station indicating the power state of the UE. In such instances, the UE may not transmit for a specified number of sub-frames. The non-transmission for the specified number of sub-frames may be an indication of the low power state of the UE. Thus, the base station may determine that the UE is in a power limited state after the specified number of sub-frames has occurred without a transmission from the UE. The UE may then receive an RRC message containing a sub-frame allocation based on the low power state of the UE. The UE may then operate according to the sub-frame allocation received in the RRC message.

It is apparent for those skilled in the art that, for the particular processes of the modules described above (such as modules 911, 921, 931, 941, 951, and 961), reference may be made to the corresponding steps (such as steps 910, 920, 930, 940, 950, and 960, respectively) in the related process embodiment sharing the same concept and the reference is regarded as the disclosure of the related modules as well. Furthermore, processor 902 may be implemented in software, hardware or combination thereof. More specifically, processor 902 may be implemented as a processing element, which includes, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processor 802 may be implemented as a general-purpose processor such as a CPU, and therefore each module can be implemented with the CPU executing instructions stored in a memory which perform a respective step.

Transmit Duty Cycle Management

As disclosed above, sub-frames may be allocated among multiple UEs via time multiplexing. Thus, low power devices may share resources within a frame. In addition, the techniques disclosed above may allow sub-frame allocated UEs to co-exist on the network with UEs with unlimited sub-frame allocation. Further, techniques disclosed above may allow a UE to have different sub-frame allocations based on various factors. Additionally, a UE may switch between being a limited sub-frame allocated UE to a UE with unlimited sub-frame allocation depending on circumstances associated with the UE.

In some scenarios, a UE may have a link budget constraint (or limitation) compared to typical UEs. For example, a UE may have a link budget constrained by 10-15 dB as compared to typical UEs. In other words, a UE may be power constrained in some way that may affect its link budget, e.g., due to signal conditions, antenna size and/or power requirements, and/or battery charge. Note that these conditions may occur at the UE at varying times and/or in any combination. In some instances, due to the link budget constraint, the UE may need to operate at a higher peak transmit power (e.g., 23 dBm peak transmit power). The higher peak transmit power may not limit the UE if a battery of the UE has a full chemical charge (e.g., has a fully charged battery), or a near full chemical charge, however, as the battery of the UE discharges (i.e., as the chemical charge of the battery dissipates over time), the UE may not be able to maintain the higher peak transmit power continuously. Additionally, continuous transmission at the higher peak transmit power may result increased operating temperatures for the UE (i.e., an increased thermal load on the UE that may require mitigation to protect components of the UE). In both instances, the UE may need to limit transmissions at the higher peak transmit power. In other words, the UE may not be able to transmit continuously at the higher peak transmit power in all conditions. Thus, the transmit duty cycle may need to be altered or throttled under certain conditions.

In some embodiments, a UE may alter a transmit duty cycle based on battery charge state, radio conditions, and/or thermal conditions. Note that the transmit duty cycle may be applied to uplink transmissions and the UE may receive all scheduled downlink communications, according to some embodiments. Additionally, the UE may autonomously manage the transmit duty cycle. In other words, changing of the transmit duty cycle may be managed at the UE and not driven (managed) by a network. In some embodiments, the UE may attempt to minimize impact of changing the transmit duty cycle on network key performance indicators (KPI) via messaging with the network explicitly indicating a change in transmit duty cycle and by implicitly excising discontinuous transmission (DTX) pattern.

In some embodiments, the UE may control a transmit duty cycle for a physical uplink shared channel (PUSCH) and/or a physical uplink control channel (PUCCH). The UE may locally control the transmit duty cycle and may additionally control a peak power transmit duty cycle. The UE may use a transmit duty cycle for thermal reasons and a peak power transmit cycle for peak power reasons. In some embodiments, the UE may have two transmit duty cycle states. In a first state (e.g., a normal state, the UE may operate without transmit duty cycle control. In other words, the UE may not limit transmissions in the first state. In a second state (e.g., a restricted state) the UE may limit transmissions based on a transmit duty cycle. For example, for buffer status report triggered uplink (UL) grants, the UE may send a target transmit duty cycle limited UL BSR to the network which may result in throttled BSR triggered UL grants for data and/or VoLTE transmissions. As another example, for unsolicited UL grants, such as periodic UL grants for VoLTE, the UE may blank transmissions or use a DTX pattern along with various mitigation methods (e.g., setting the transmit duty cycle to 75%, 70%, 50%, and so forth) to avoid impacting a network PDCCH outer loop. In other words, if the unsolicited UL grants fall outside of the target transmit duty cycle of the UE, the UE may implement the target transmit duty cycle via a DTX pattern.

In some embodiments, the UE may send a MAC control element message to the network to inform the network of the UE's transmit duty cycle. For example, the UE may include a target transmit duty cycle and/or an optional DTX pattern. In response, if the network supports UE triggered transmit duty cycle control, the network may schedule the UE based on the transmit duty cycle control which may minimize the impact of the UE not honoring some UL grants.

Figure 10A:
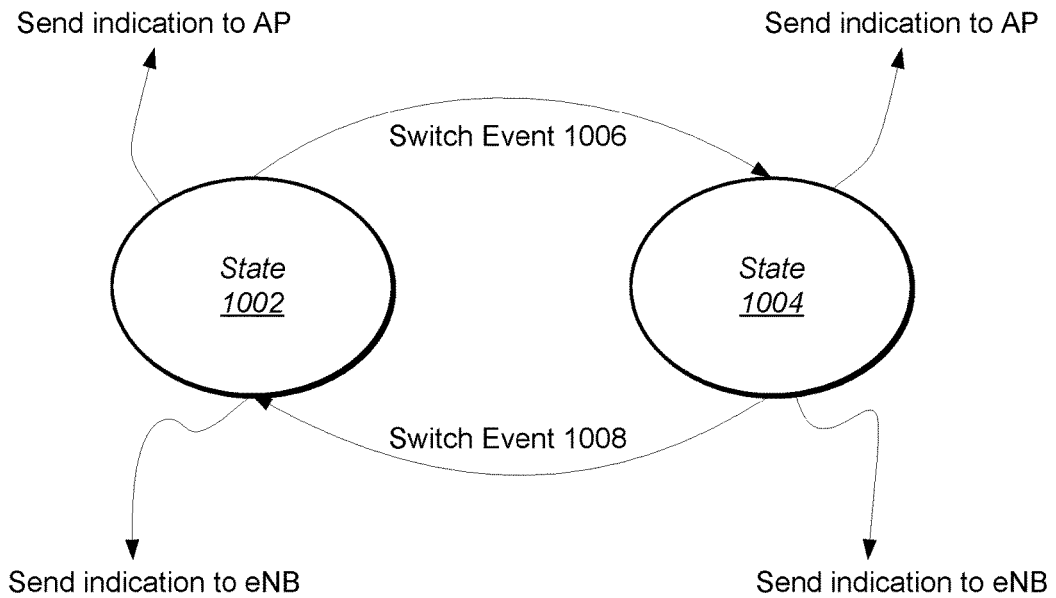
FIG. 10A illustrates state transitions for a UE, according to some embodiments.
Figure 10B:
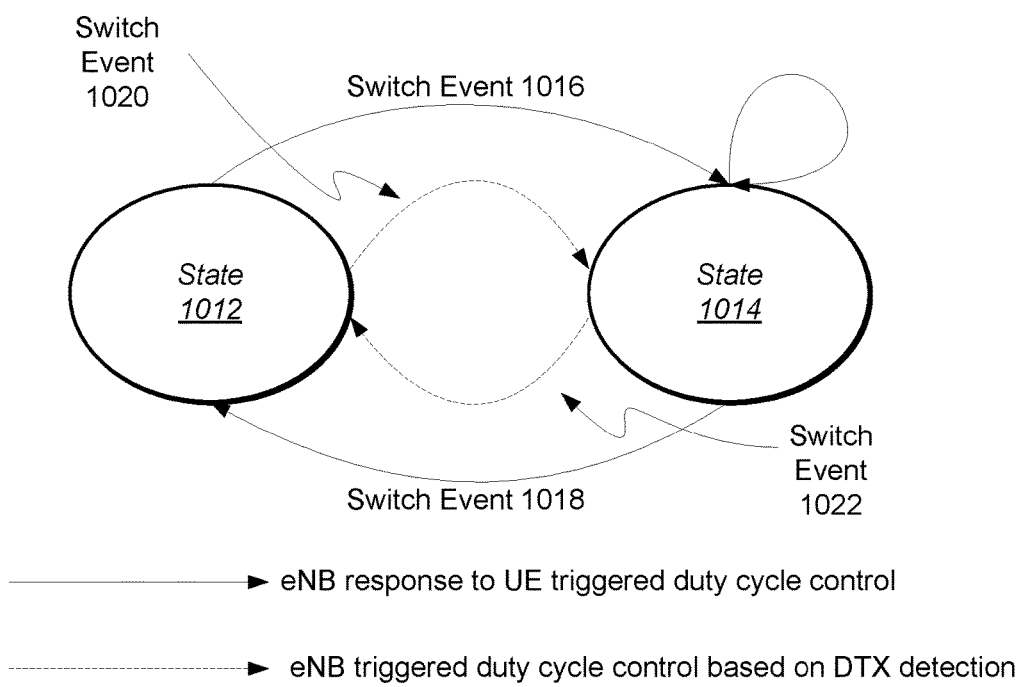
FIG. 10B illustrates state transitions for a base station, according to some embodiments.

FIG. 10A illustrates state transitions for a UE, such as UE 106, according to embodiments and FIG. 10B illustrates state transitions for a base station, such as base station 102, according to embodiments. The state transitions shown in FIGS. 10A and 10B may be used in conjunction with any of the computer systems, devices, elements, or components disclosed herein, among other devices. Additional states may also be added as desired.

As discussed above, a UE, such as UE 106 may maintain a first state, such as state 1002. State 1002 may be associated with a normal state and the UE may operate with a normal (or standard) duty cycle. In other words, the UE may not limit transmissions to a base station in state 1002. Note that state 1002 may be associated with a baseband layer of the UE and the baseband layer of the UE may notify, via a message or indication, an application processor of the UE that the UE is in (or is maintaining) state 1002. In addition, while maintaining state 1002, the UE may send an indication or message to a base station that the UE is in (or maintaining) state 1002. As shown in FIG. 10B, the base station may maintain state 1012 which corresponds to state 1002. Note that although the UE may send an indication to the base station, the base station may not send a message or indication back to the UE indicating the state of the base station. In other words, there is no requirement for handshaking between the base station and UE for each to maintain corresponding states.

In some embodiments, the UE may detect a first switch event, such as switch event 1006. Detection of switch event 1006 may cause the UE to change (or switch) states. In other words, in response to the first switch event, the UE may transition from a first state (e.g., state 1002) to another state, such as state 1004. State 1004 may be associated with a restricted state and the UE may operate with a restricted transmit duty cycle while in state 1004. Switch event 1006 may include one or more conditions (or metrics) monitored locally by the UE. The one or more conditions may include the UE monitoring multiple metrics and comparing each of the multiple metrics to respective thresholds. For example, the UE may monitor a transmission blanking rate for a period of time and compare it to a transmission blanking rate threshold and switch from state 1002 to state 1004 if the transmission blanking rate exceeds the transmission blanking rate threshold. Note that the transmission blanking rate threshold may be any of various values, such as 1%, 2%, 5%, 10%, 20%, and so forth. Note additionally that the transmission blanking rate may be based on a pre under voltage lockout (preUVLO) signal.

As another example, the UE may monitor a battery chemical charge level and compare the battery chemical charge level to a battery chemical charge threshold and switch from state 1002 to state 1004 if the battery chemical charge level is less than or equal to the battery chemical charge threshold. Note that the battery chemical charge threshold may be any of various values, such as 5%, 10%, 15%, 20%, 25%, 30%, and so forth. In some embodiments, the UE may also monitor the rate of battery chemical charge dissipation and compare it to a battery chemical charge dissipation threshold and switch from state 1002 to state 1004 if the rate of battery chemical charge dissipation exceeds the threshold. In some embodiments, the UE may only monitor the rate of battery chemical charge dissipation once the battery chemical charge level drops below a specified level (e.g., 10%, 20%, 30%, 40%, 50%, and so forth).

As yet another example, the UE may monitor audio frame error rate (FER) and compare it to a FER threshold and switch from state 1002 to state 1004 if the audio FER exceeds the FER threshold. Note that the FER threshold may be between 1% and 10%, among other values.

It should be noted that other conditions may trigger the UE to switch from state 1002 to state 1004. For example, the UE may switch from state 1002 to state 1004 based on thermal load on various components of the UE. Thus, the UE may monitor internal temperatures of various components and compare the internal temperatures to respective thresholds. In addition, the condition that triggers the UE to switch from state 1002 to state 1004 may include scenarios in which none of the monitored conditions (e.g., metrics comparable to respective thresholds) would independently trigger a switch from state 1002 to state 1004, however, in combination, indicate to the UE a need to switch from state 1002 to state 1004. In other words, the UE may monitor multiple conditions and adjust respective thresholds (e.g., consider the threshold plus some margin, e.g., within 1 to 10 percent of the threshold) such that switch event 1006 is triggered based on an occurrence of multiple conditions. For example, the UE may detect that the thermal load on the UE is increasing and the battery chemical charge is near the battery chemical charge threshold and/or the transmission blanking rate is near the transmission blanking threshold and trigger switch event 1006. Alternatively, the UE may require multiple conditions to occur to trigger switch event 1006. For example, these multiple conditions may include the FER rate exceeding the FER threshold and the battery chemical charge level being less than the battery chemical charge threshold and/or the transmission blanking rate exceeding the transmission blanking threshold.

In state 1004 the UE may operate according to a restricted transmit duty cycle. In other words, the UE may reduce transmissions within a sub-frame and may blank (or skip) allocated sub-frames. For example for BSR triggered UL grants for data and/or VoLTE audio, the UE may limit a BSR report to include only data volume which would be allowed by the transmit duty cycle target. As another example, the UE may perform a discontinuous transmission action (e.g., blank, skip, transmit with a lower transmission power, and/or not transmit) for over-allocated (in terms of the transmit duty cycle) UL grants. In other words, the UE, based on the transmit duty cycle, may skip transmission for each allocated sub-frame that does not coincide with sub-frames the UE would transmit on based on the transmit duty cycle. As another example, for unsolicited UL grants periodically allocated every 20 ms/40 ms for VoLTE audio packets, the UE may perform a discontinuous transmission action for UL grants above (or beyond) the transmit duty cycle target. In other words, if the transmit duty cycle target for the UE includes transmitting a specified number of times every 20 ms/40 ms for VoLTE, the UE may perform a discontinuous transmission action for UL grants in excess of the specified number of times. In some embodiments, the discontinuous transmission action may be performed with mitigation methods as described above.

In some embodiments, the UE may send an indication to an application processor (or processor) of the UE upon switching to (or while maintaining) state 1004. In response, the processor may proactively limit (or throttle) certain hardware components (e.g., display brightness, heart beat rate monitor, and so forth) prior to a data packet transmission session, such as a VoLTE call, starting. Alternatively, or in addition, the processor may reactively limit (or throttle) certain hardware components during the data packet transmission session.

In some embodiments, if a transmission blanking rate is greater than a threshold, the UE may send a MAC CE to the base station. The MAC CE may include information regarding the transmit duty cycle. The information may include an indication of the transmit duty cycle. The indication may be an optional discontinuous transmission pattern that the UE is using (e.g., a discontinuous transmission pattern that aligns with the transmit duty cycle of the UE). The MAC CE may be sent multiple times over multiple frames. In other words, the UE may send the MAC CE to the network N times with a periodicity of M milliseconds.

In some embodiments, the UE may detect a second switch event, such as switch event 1008. Detection of switch event 1008 may cause the UE to change (or switch) states. In other words, in response to the second switch event, the UE may transition from the second state (e.g., state 1004) to another state, such as state 1002. Switch event 1008 may include one or more conditions (or metrics) monitored locally by the UE. The one or more conditions may include the UE monitoring multiple metrics and comparing each of the multiple metrics to respective thresholds. In some embodiments, the respective thresholds may be associated with switch event 1008. In other words, the respective thresholds associated with switch event 1008 may be independent of, and/or distinct from, respective thresholds associated with switch event 1006. Alternatively, respective thresholds associated with switch event 1008 may correspond to (or be based at least in part on and/or a function of) respective thresholds associated with switch event 1006.

For example, in some embodiments, the UE may monitor transmission blanking rate while in (or maintaining) state 1004 and may compare the transmission blanking rate to a transmission blanking threshold and may trigger switch event 1008 if the transmission blanking rate is below the transmission blanking threshold. In some embodiments, the transmission blanking threshold used to trigger switch event 1008 may be distinct from (and/or independent of) the transmission blanking threshold used to trigger switch event 1006. In other embodiments, the transmission blanking thresholds may be related, e.g., equivalent, a function of one another, or one threshold may be based at least in part on the corresponding threshold. Note that the transmission blanking rate threshold may be any of various values, such as 1%, 2%, 5%, 10%, 20%, and so forth. Note additionally that the transmission blanking rate may be based on a pre under voltage lockout (preUVLO) signal.

As another example, the UE may monitor a battery chemical charge level and compare the battery chemical charge level to a battery chemical charge threshold and switch from state 1004 to state 1002 (i.e., trigger switch event 1008) if the battery chemical charge level is greater than or equal to the battery chemical charge threshold. Note that the battery chemical charge threshold may be any of various values, such as 5%, 10%, 15%, 20%, 25%, 30%, 35%, 40% and so forth. In some embodiments, the UE may also monitor the rate of battery chemical charge and compare it to a battery chemical charge threshold and switch from state 1002 to state 1004 if the rate of battery chemical charge exceeds the threshold. In some embodiments, the UE may only monitor the rate of battery chemical charge once the battery chemical charge level drops below a specified level (e.g., 10%, 20%, 30%, 40%, 50%, and so forth).

As yet another example, the UE may monitor audio frame error rate (FER) and compare it to FER threshold and switch from state 1004 to state 1002 if the audio FER is less than the FER threshold. Note that the FER threshold may be between 1% and 10%, among other values.

In some embodiments, the UE may trigger switch event 1008 if the current transmit duty cycle is less a transmit duty cycle threshold. Additionally, in some embodiments, the UE may trigger switch event 1008 if a packet data convergence protocol (PDCP) pending data volume is less than a PDCP pending data threshold.

It should be noted that other conditions may trigger the UE to switch from state 1004 to state 1002. For example, the UE may switch from state 1004 to state 1002 based on thermal load on various components of the UE. Thus, the UE may monitor internal temperatures of various components and compare the internal temperatures to respective thresholds. In addition, the condition that triggers the UE to switch from state 1004 to state 1002 may include scenarios in which none of the monitored conditions (e.g., metrics comparable to respective thresholds) would independently trigger a switch from state 1004 to state 1002, however, in combination, indicate to the UE that it may switch from state 1004 to state 1002. In other words, the UE may monitor multiple conditions and adjust respective thresholds (e.g., consider the threshold less some margin, e.g., within 1 to 10 percent of the threshold) such that switch event 1008 is triggered based on an occurrence of multiple conditions. For example, the UE may detect that the thermal load on the UE is decreasing and the battery chemical charge is near the battery chemical charge threshold and/or the transmission blanking rate is near the transmission blanking threshold and trigger switch event 1006. Alternatively, the UE may require multiple conditions to occur to trigger switch event 1006. For example, the FER rate is less than the FER threshold and the battery chemical charge level is greater than the battery chemical charge threshold and/or the transmission blanking rate is less than the transmission blanking threshold.

After switch event 1008 has been triggered, the UE may return to state 1002 and may discontinue (or stop) local transmit duty cycle control. In other words, the UE may discontinue restricting UL transmissions. Additionally, the UE may send a MAC CE to the base station including an indication the UE has returned to normal operation (i.e., the UE is no longer limiting UL transmissions locally). The MAC CE may be sent multiple times over multiple frames. In other words, the UE may send the MAC CE to the network N times with a periodicity of M milliseconds. Note that the network may or may not allocate all requested UL grants as per the UE's desired normal transmit duty cycle.

Additionally, in some embodiments, the UE may send an indication to the application processor (or processor) of the UE that the UE is in state 1002. In response, the processor may discontinue limiting (or throttling) certain hardware components.

As noted above, FIG. 10B illustrates state transitions for a base station, such as base station 102, according to embodiments. A base station may maintain a first state, such as state 1012 that corresponds to state 1002 of the UE. As noted above, the UE may send an indication (e.g., a MAC control element) to the base station that the UE is maintaining (or operating in or switching to) state 1004. The indication may cause the base station to switch from state 1012, which corresponds to state 1002 of the UE, to state 1014, which corresponds to state 1004 of the UE. In other words, if the base station is operating in state 1012, the indication the UE sends while operating in state 1004 may cause switch event 1016. In some embodiments, the UE may send the indication in response to switch event 1006. Similarly, the base station may maintain state 1014, corresponding to state 1004, and may receive an indication from the UE that the UE is maintaining (or operating in or switching to) state 1002. The indication may cause the base station to switch from state 1014, which corresponds to state 1004 of the UE, to state 1012, which corresponds to state 1002 of the UE. In other words, if the base station is operating in state 1014, the indication the UE sends while operating in state 1002 may cause switch event 1018. In some embodiments, the UE may send the indication in response to switch event 1008.

In some embodiments, the base station may detect the discontinuous transmission cycle of the UE and in response, may trigger either switch event 1020 or switch event 1022, depending on the current state of the base station. If the base station is maintaining state 1012 and detects a new discontinuous transmission cycle indicating that the UE has a reduced transmit duty cycle, the base station may trigger switch event 1020. If the base station is maintaining state 1014 and detects a new discontinuous transmission cycle indicating that the UE has an increased transmit duty cycle (e.g., a standard or normal transmit duty cycle), the base station may trigger switch event 1022.

It should be noted that whether the UE controls the transmit duty cycle or the network (base station) controls the transmit duty cycle, the result is that the UE may extend a delay time for an UL packet to start a first HARQ transmission. Thus, for VoLTE audio packets, the UE may increase audio FER due to dropping UL audio packets if the delay time is greater than 100 ms which may reduce VoLTE link budget. Additionally, UE transmit duty cycle control may not honor some UL grants (e.g., if the UL grants do not coincide with sub-frames the UE will transmit in based on transmit duty cycle) which may impact the network's downlink (DL) PDCCH outer loop.

As noted above, in some embodiments, the UE may attempt to minimize impact of changing the transmit duty cycle on network key performance indicators (KPI). In other words, the UE may attempt to mitigate the impact of the transmit duty cycle on the network. In some embodiments, the UE may monitor signal-to-noise ratio (SNR) of the DL PDCCH and if the DL PDCCH SNR is below a PDCCH SNR threshold, the UE may implement the transmit duty cycle. However, if the DL PDCCH SNR is above the PDCCH SNR threshold, the UE may not fully implement the transmit duty cycle to minimize impact on network KPI. For example, the UE may only blank (or skip) transmission on non-RV0 (redundancy version 0) sub-frames (e.g., non-RV0 transmit time intervals (TTIs) in a transmit time interval block (TTIB)). As another example, the UE may excise transmissions with a power back off. Alternatively, or in addition, the UE may transmit on lower power PUCCH instead of PUSCH at peak transmit power to reduce VoLTE link budget.

In some embodiments, when a battery of a UE have a chemical charge level greater than or equal to 30%, it is estimated that there may be more than a seven times reduction in preUVLOs (e.g., from 70 preUVLOs down to 10), thus, the UE in such embodiments may support an LTE transmit duty cycle of 100% (i.e., continuous transmission). Thus, a normal duty cycle, according to some embodiments, may be considered a transmit duty cycle of 100%. However, when the chemical charge level of the battery is than or equal to 10%, the UE may need to reduce transmissions and change the transmit duty cycle. For example, when SDU FER is between 1 and 10 percent (e.g., when transmit blanking rate is greater than or equal to 8% and SDU FER is greater than or equal to 8% for 250 milliseconds), the UE may enter a restricted transmit duty cycle state with a maximum transmit duty cycle of 75%. In addition, the UE may send a MAC CE to the network indicating the transmit duty cycle targeted by the UE (e.g., 75% transmit duty cycle). Further, when SDU FER is less than or equal to 1% for a time period such as 500 milliseconds, the UE may enter a normal transmit duty cycle (i.e., continuous transmission or 100%) and may send a MAC CE to the network indicating the transmit duty cycle targeted by the UE (e.g., 100% transmit duty cycle). Additionally, or alternatively, when the chemical charge level of the battery increases to greater than or equal to 30%, the UE may also enter a normal transmit duty cycle. (i.e., continuous transmission or 100%) and may send a MAC CE to the network indicating the transmit duty cycle targeted by the UE (e.g., 100% transmit duty cycle).

Figure 11A:
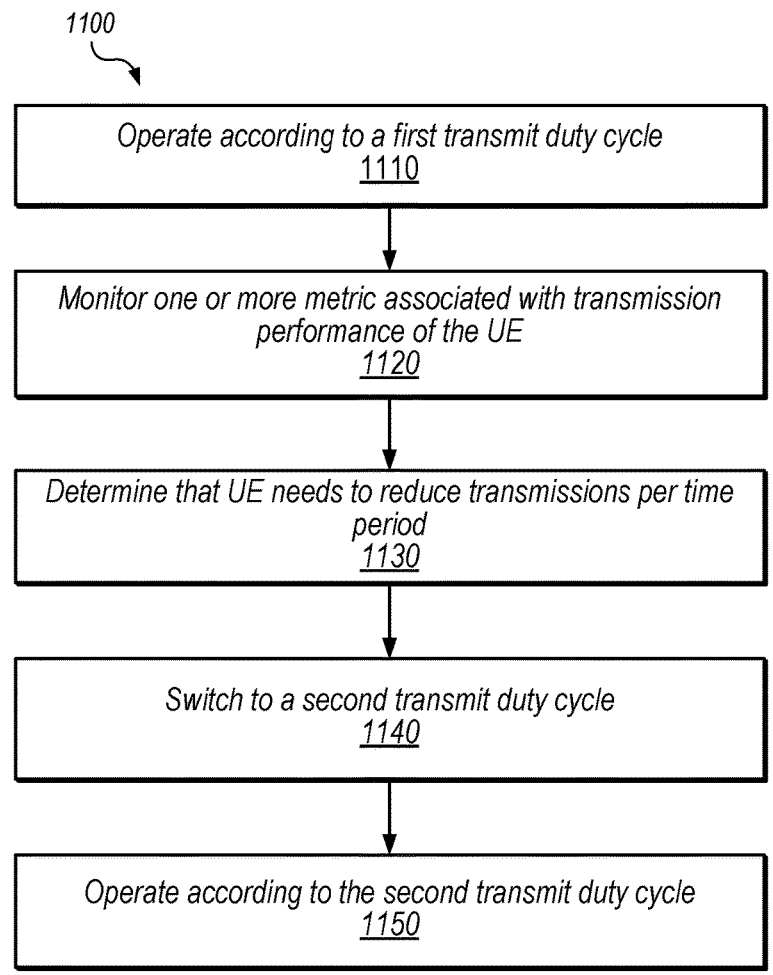
FIG. 11A illustrates a method for switching between transmit duty cycles, according to some embodiments.

FIG. 11A shows a flow diagram illustration of a method 1100 for switching between transmit duty cycles, according to some embodiments. The method shown in FIG. 11A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. As shown, the method 1100 may be performed as follows.

At 1110, a UE, such as UE 106, may operate according to a first transmit duty cycle. The first transmit duty cycle may specify a first number of transmissions per time period. The first transmit duty cycle may correspond to state 1002 as described above with reference to FIG. 10A.

At 1120, the UE may monitor one or more metrics associated with transmission performance of the UE. Note that the one or more metrics may include any of the metrics (and/or conditions) described above in reference to FIG. 10A.

At 1130, the UE may determine that the UE needs to reduce transmissions per time period. The determination may be based at least in part on at least one metric of the one or more metrics. In other words, the UE may determine that at least one of the one or more metrics indicates that the UE needs to reduce transmissions per time period. Note that the one or more metrics may include any of the metrics (and/or conditions) described above in reference to FIG. 10A. Additionally, the indication may be based on comparison of a metric to an associated threshold as described above.

At 1140, the UE may switch to a second transmit duty cycle. The second transmit duty cycle specifies a second number of transmissions per time period. The second number may be less than the first number. The second transmit duty cycle may correspond to state 1004 as described above with reference to FIG. 10A.

In some embodiments, the UE may determine that at least one of metric of the one or more metrics indicates that the UE may increase transmissions. Further, the UE may determine a third transmit duty cycle. The third transmit duty cycle may specify a third number of transmissions per time period. The third number may be greater than the second number. In some embodiments, the third number may be equivalent to the first number. The UE may operate according to the third transmit duty cycle.

At 1150, the UE may operate according to the second transmit duty cycle. In some embodiments, the UE may transmit an indication to a base station that the UE is operating according to the second transmit duty cycle.

Figure 11B:
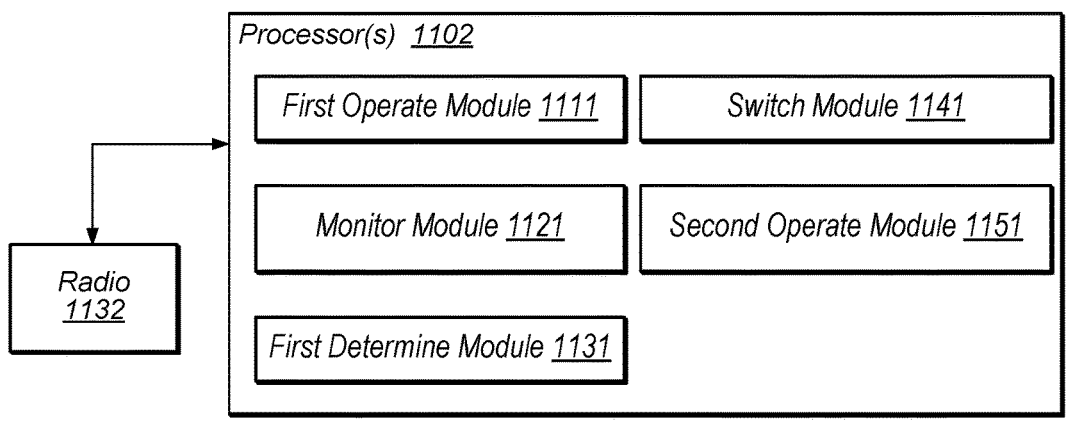
FIG. 11B illustrates a processor including modules for switching between transmit duty cycles, according to some embodiments.

FIG. 11B illustrates a processor including modules for switching between transmit duty cycles, according to some embodiments. In some embodiments, radio 1132 (which may be equivalent to radio 330 described above) may be coupled to processor 1102 (which may be equivalent to processor(s) 302 described above). The processor may be configured to perform the method described above in reference to FIG. 11A. In some embodiments, processor 1102 may include one or more modules, such as modules 1111-1151, and the modules may be configured to perform various steps of the method described above in reference to FIG. 11A. As shown, the modules may be configured as follows.

In some embodiments, processor 1102 may include a first operate module 1111 configured to operate the UE according to a first transmit duty cycle. The first transmit duty cycle may specify a first number of transmissions per time period. The first transmit duty cycle may correspond to state 1002 as described above with reference to FIG. 10A.

Processor 1102 may also include monitor module 1121 configured to monitor one or more metrics associated with transmission performance of the UE. Note that the one or more metrics may include any of the metrics (and/or conditions) described above in reference to FIG. 10A.

Processor 1102 may also include monitor module 1131 configured to determine that the UE needs to reduce transmissions per time period. The determination may be based at least in part on at least one metric of the one or more metrics. In other words, the UE may determine that at least one of the one or more metrics indicates that the UE needs to reduce transmissions per time period. Note that the one or more metrics may include any of the metrics (and/or conditions) described above in reference to FIG. 10A. Additionally, the indication may be based on comparison of a metric to an associated threshold as described above.

Processor 1102 may also include switch module 1141 configured to switch the UE a second transmit duty cycle. The second transmit duty cycle specifies a second number of transmissions per time period. The second number may be less than the first number. The second transmit duty cycle may correspond to state 1004 as described above with reference to FIG. 10A.

Additionally, processor 1102 may include second operate module 1151 configured to operate the UE according to the second transmit duty cycle.

It is apparent for those skilled in the art that, for the particular processes of the modules described above (such as modules 1111, 1121, 1131, 1141, and 1151), reference may be made to the corresponding steps (such as steps 1110, 1120, 1130, 1140, and 1150, respectively) in the related process embodiment sharing the same concept and the reference is regarded as the disclosure of the related modules as well. Furthermore, processor 1102 may be implemented in software, hardware or combination thereof. More specifically, processor 1102 may be implemented as a processing element, which includes, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processor 1102 may be implemented as a general-purpose processor such as a CPU, and therefore each module can be implemented with the CPU executing instructions stored in a memory which perform a respective step.

Figure 12A:
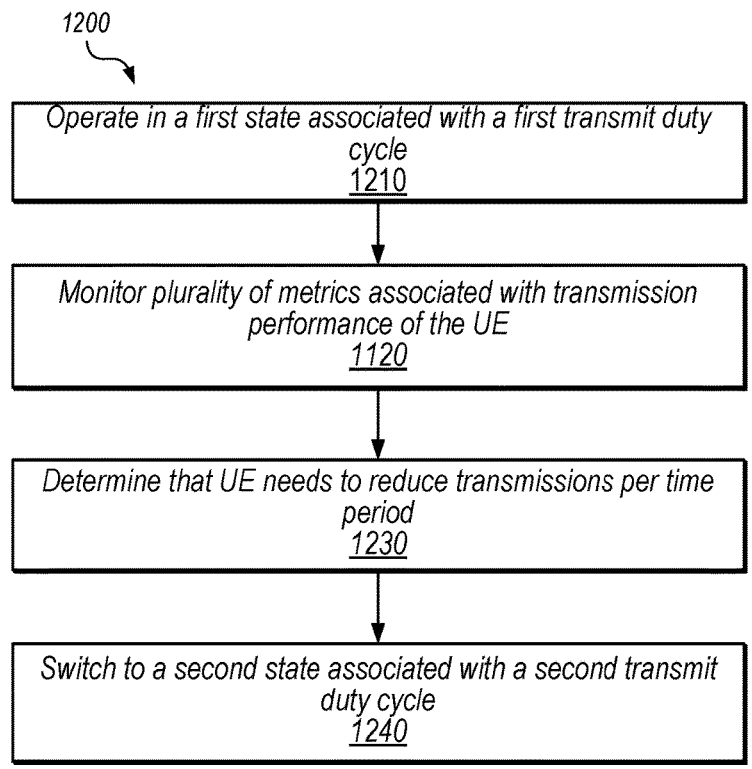
FIG. 12A illustrates a method for switching between transmit duty cycles, according to some embodiments.

FIG. 12A shows a flow diagram illustration of a method 1200 for switching between transmit duty cycles, according to some embodiments. The method shown in FIG. 12A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. As shown, the method 1200 may be performed as follows.

At 1210, the UE may operate in a first state associated with a first transmit duty cycle. The first state may correspond to state 1002 above. The first transmit duty cycle may specify a first number of transmissions per time period.

At 1220, the UE may monitor a plurality of metrics associated with transmission performance of the UE. Note that the plurality of metrics may include any of the metrics (and/or conditions) described above in reference to FIG. 10A.

At 1230, the UE may determine that at least one metric of the plurality of metrics indicates that the UE may need to reduce transmissions per time period. The indication may be based on comparison of a metric to an associated threshold as described above.

At 1240, the UE may switch to a second state. The second state may be associated with a second transmit duty cycle. The second transmit duty cycle may specify a second number of transmissions per time period. The second number may be less than the first number. The second state may correspond to state 1004 above. The switch may correspond to switch event 1006 above.

In some embodiments, the UE may transmit an indication to a base station that the UE is switching to the second transmit duty cycle. The indication may be included in a MAC control element.

In some embodiments, the UE may operate in the second state and determine that at least one of metric of the one or more metrics indicates that the UE can increase transmissions. The UE may switch, based on the determination that at least one of metric of the one or more metrics indicates that the UE can increase transmissions, to the first state. The switch may correspond to switch event 1008 above.

Figure 12B:
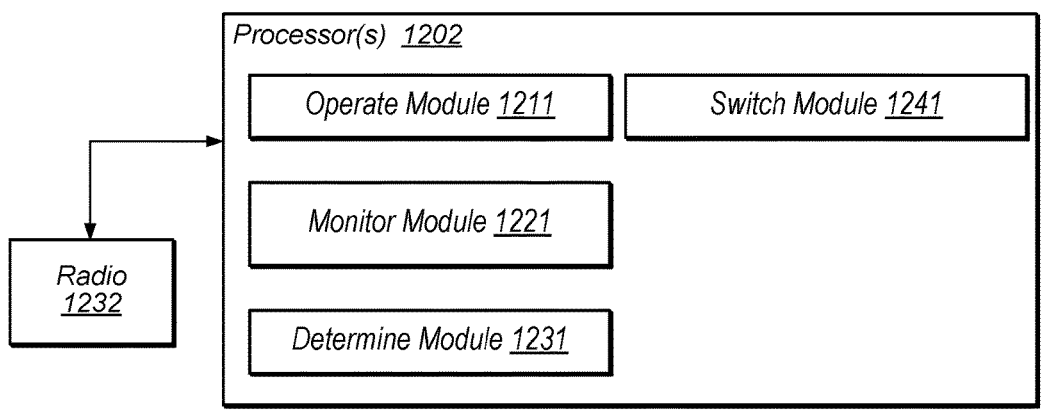
FIG. 12B illustrates a processor including modules for switching between transmit duty cycles, according to some embodiments.

FIG. 12B illustrates a processor including modules for switching between transmit duty cycles, according to some embodiments. In some embodiments, radio 1232 (which may be equivalent to radio 330 described above) may be coupled to processor 1202 (which may be equivalent to processor(s) 302 described above). The processor may be configured to perform the method described above in reference to FIG. 12A. In some embodiments, processor 1202 may include one or more modules, such as modules 1211-1241, and the modules may be configured to perform various steps of the method described above in reference to FIG. 12A. As shown, the modules may be configured as follows.

In some embodiments, processor 1202 may include operate module 1211 configured to operate the UE in a first state associated with a first transmit duty cycle. The first state may correspond to state 1002 above. The first transmit duty cycle may specify a first number of transmissions per time period.

Processor 1202 may also include monitor module 1221 configured to monitor a plurality of metrics associated with transmission performance of the UE. Note that the plurality of metrics may include any of the metrics (and/or conditions) described above in reference to FIG. 10A.

In addition, processor 1202 may include determine module 1231 configured to determine that at least one metric of the plurality of metrics indicates that the UE may need to reduce transmissions per time period. The indication may be based on comparison of a metric to an associated threshold as described above.

Additionally, processor 1202 may include switch module 1241 configured to switch the UE to a second state. The second state may be associated with a second transmit duty cycle. The second transmit duty cycle may specify a second number of transmissions per time period. The second number may be less than the first number. The second state may correspond to state 1004 above. The switch may correspond to switch event 1006 above.

It is apparent for those skilled in the art that, for the particular processes of the modules described above (such as modules 1211, 1221, 1231, and 1241), reference may be made to the corresponding steps (such as steps 1210, 1220, 1230, and 1240, respectively) in the related process embodiment sharing the same concept and the reference is regarded as the disclosure of the related modules as well. Furthermore, processor 1202 may be implemented in software, hardware or combination thereof. More specifically, processor 1202 may be implemented as a processing element, which includes, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processor 1202 may be implemented as a general-purpose processor such as a CPU, and therefore each module can be implemented with the CPU executing instructions stored in a memory which perform a respective step.

Figure 13A:
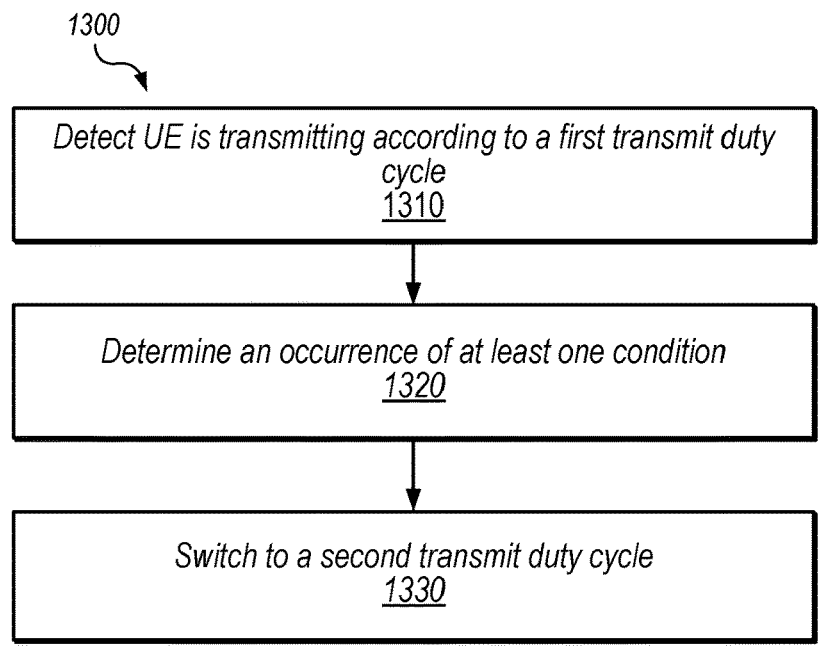
FIG. 13A illustrates a method for switching between transmit duty cycles, according to some embodiments.

FIG. 13A shows a flow diagram illustration of a method 1300 for switching between transmit duty cycles, according to some embodiments. The method shown in FIG. 13A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. As shown, the method 1300 may be performed as follows.

At 1310, the UE may detect that it is transmitting according to a first transmit duty cycle. The first transmit duty cycle may specify a first number of transmissions per time period. The first transmit duty cycle may be associated with a first state, such as state 1002 above.

At 1320, the UE may determine an occurrence of at least one condition. The occurrence may indicate that the UE needs to reduce transmissions per time period. In some embodiments, the occurrence may be based on monitoring of metrics or conditions such as those described above in reference to FIG. 10A.

At 1330, the UE may switch to a second transmit duty cycle in response to the determination. The second transmit duty cycle may specify a second number of transmissions per time period and the second number is less than the first number. The second transmit duty cycle may be associated with a second state. The second state may correspond to state 1004 above. The switch may correspond to switch event 1006 above.

In some embodiments, the UE may detect that the UE is transmitting according to the second state and determine an occurrence of at least one additional condition. The occurrence may indicate that the UE can increase transmissions per time period and the UE may switch, based on the determination of the occurrence of the at least one additional condition, to the first transmit duty cycle.

Figure 13B:
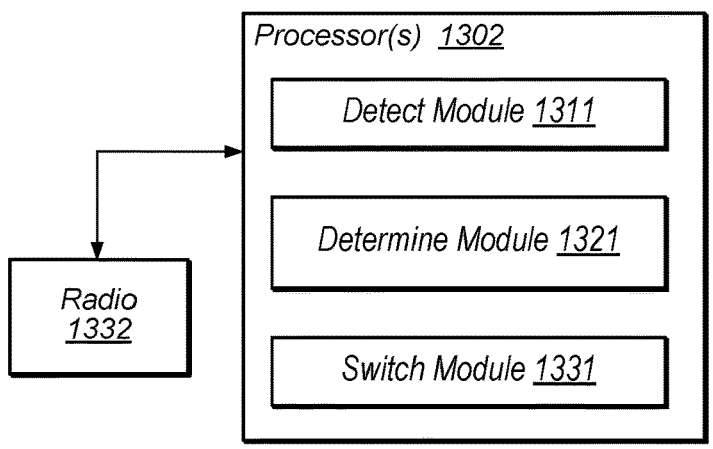
FIG. 13B illustrates a processor including modules for switching between transmit duty cycles, according to some embodiments.

FIG. 13B illustrates a processor including modules for switching between transmit duty cycles, according to some embodiments. In some embodiments, radio 1332 (which may be equivalent to radio 330 described above) may be coupled to processor 1302 (which may be equivalent to processor(s) 302 described above). The processor may be configured to perform the method described above in reference to FIG. 13A. In some embodiments, processor 1302 may include one or more modules, such as modules 1311-1331, and the modules may be configured to perform various steps of the method described above in reference to FIG. 13A. As shown, the modules may be configured as follows.

In some embodiments, processor 1302 may include detect module 1311 configured to detect that the UE is transmitting according to a first transmit duty cycle. The first transmit duty cycle may specify a first number of transmissions per time period. The first transmit duty cycle may be associated with a first state, such as state 1002 above.

Additionally, processor 1302 may include determine module 1320 configured to determine an occurrence of at least one condition. The occurrence may indicate that the UE needs to reduce transmissions per time period. In some embodiments, the occurrence may be based on monitoring of metrics or conditions such as those described above in reference to FIG. 10A.

In addition, processor 1302 may include switch module 1331 configured to switch the UE to a second transmit duty cycle in response to the determination. The second transmit duty cycle may specify a second number of transmissions per time period and the second number is less than the first number. The second transmit duty cycle may be associated with a second state. The second state may correspond to state 1004 above. The switch may correspond to switch event 1006 above.

It is apparent for those skilled in the art that, for the particular processes of the modules described above (such as modules 1311, 1321, and 1331), reference may be made to the corresponding steps (such as steps 1310, 1320, and 1330, respectively) in the related process embodiment sharing the same concept and the reference is regarded as the disclosure of the related modules as well. Furthermore, processor 1302 may be implemented in software, hardware or combination thereof. More specifically, processor 1302 may be implemented as a processing element, which includes, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processor 1302 may be implemented as a general-purpose processor such as a CPU, and therefore each module can be implemented with the CPU executing instructions stored in a memory which perform a respective step.

FIGS. 14A-14C—TDD UL/DL Frame Configurations

In current LTE 3GPP specifications (e.g., Rel-8 through Rel-12), 7 time division duplex (TDD) uplink/downlink (UL/DL) frame configurations are defined. They are statically configured across all intra frequency cells. The LTE frame may have a periodicity of 5 or 10 milliseconds (ms). According to the specifications, all UEs use the same static TDD UL/DL configuration in a TDD cell. FIG. 14A illustrates the 7 TDD UL/DL frame configurations according to the specifications. As shown, each frame includes 10 sub-frames (sfn0-sfn9), with each sub-frame designated for uplink (U or UL), downlink (D or DL), or special (S). Note that a special sub-frame is used to transition from a downlink sub-frame to an uplink sub-frame but not necessary when the UE transitions from an uplink sub-frame to a downlink sub-frame.

FIG. 14B illustrates acknowledge (ACK) and negative acknowledge (NAK) downlink association set index, K, as defined in the current LTE 3GPP specifications association sets for each sub-frame of each TDD UL/DL frame, where K: {k0, k1, ... km−1}. For example, for configuration 1 which has a standard allocation of DSUUDDSUUD (see FIG. 14A), sub-frame 2 has an allocation set of {6, 7}, sub-frame 3 has an allocation set of {4}, and so forth.

FIG. 14C illustrates adjustments to the downlink association set index, K, according to the current LTE 3GPP specifications. For example, as explained in the current LTE 3GPP specifications, for TDD UL/DL configurations 1-6 and normal HARQ operation, the UE shall upon detection of a PDCCH with DCI format 0 and/or a PHICH transmission in sub-frame n intended for the UE, adjust the corresponding PUSCH transmission in sub-frame n+K, with K given in the table illustrated in FIG. 14C. As another example, for TDD UL/DL configuration 0 and normal HARQ operation the UE shall upon detection of a PDCCH with DCI format 0 and/or a PHICH transmission in sub-frame n intended for the UE, adjust the corresponding PUSCH transmission in sub-frame n+K if the MSB of the UL index in the DCI format 0 is set to 1 or PHICH is received in sub-frame n=0 or 5, with K given in the table illustrated in FIG. 14C. As another example, if, for TDD UL/DL configuration 0 and normal HARQ operation, the LSB of the UL index in the DCI format 0 is set to 1 in sub-frame n or a PHICH is received in sub-frame n=0 or 5 or PHICH is received in sub-frame n=1 or 6, the UE shall adjust the corresponding PUSCH transmission in sub-frame n+7. However If, for TDD UL/DL configuration 0, both the MSB and LSB of the UL index in the DCI format 0 are set in sub-frame n, the UE shall adjust the corresponding PUSCH transmission in both sub-frames n+k and n+7, with K given in the table illustrated in FIG. 14C.

Dynamic UL Sub-Frame Allocation for TDD Low Power LTE

As mentioned above, in order to support LTE cellular technology in low power devices (e.g., UE's that are power limited and/or power restricted due to battery size or batter charge, among other reasons), various basic issues should be considered. First, low power devices may have limited RF range in both transmit (TX) and receive (RX). Additionally, low power devices may have both limited peak and average TX power for UL communications. Further, support for low power devices should be compatible with, or an extension of, current 3GPP LTE standards. In addition, support for low power devices should have minimum or no impact on LTE network capacity and LTE physical layers. In other words, support for low power devices should be devised as to ease implementation.

Thus, in some embodiments a low power device (e.g., UE 106 described above) may conserve battery drain with the implementation of a transmit (TX) duty cycle. In other words, to prevent quick battery current drain due to consecutive TX transmission in higher TX power conditions, a TX duty cycle may be used by the low power device. In such embodiments, the number of sub-frames in which the low power device may transmit may be reduced. Additionally, a number of TX sub-frames (e.g., UL sub-frames in which the low power device transmits) in a TX duty cycle period may be related to the TX power of the TX sub-frames. For example, in a duty cycle period, only one or N (e.g., a number greater than 1, in other words, one or more) TX sub-frames may be transmitted in maximum TX power. Further, the number of TX sub-frames (contiguous or non-contiguous) in a duty cycle period may increase as the TX power decreases. In other words, as the power requirements for transmission decreases, the more times (e.g., more often) a low power device may transmit in a duty cycle. Thus, a relationship between the number of TX sub-frames and corresponding TX power may be defined and quantified. Note that in some embodiments, under certain TX power threshold conditions, contiguous TX in a duty cycle period may be allowed. Additionally, in some embodiments, the TX duty cycle period may be extended as needed; for example, due to heavy system usage or battery state of charge (e.g., the batter power runs low). Note that since the TDD LTE UL/DL frame configuration has 5 ms or 10 ms periodicity, the TX duty cycle period should be chosen as a multiple of 10 milliseconds (ms) (e.g., N*10 ms). Further, as discussed in more detail below, for FDD LTE, due to both UL and DL hybrid automatic repeat request (HARD) round trip time (RTT) being 8 ms, the duty cycle should be chosen as a multiple of 8 ms (e.g., N*8 ms)

As mentioned above, LTE defines seven UL/DL frame configurations which are statically configured across all intra frequency cells. Thus, the 3GPP specifications (e.g., the LTE standards) do not have any mechanism for the UE (e.g., the low power device) to inform the network (e.g., base station 102) of how many TX (UL) sub-frames the UE may be capable of in a TX duty cycle period (e.g., 10 ms). Thus, there are three consequences that may occur due to the UE being unable to inform the network of the UE's TX duty cycle. First, based on a UE pending data buffer status report, the network may assign UL grants in multiple UL TX sub-frames, however, the UE may not be able to transmit in each of the sub-frames assigned by the UL grants due to the TX duty cycle limitation and network radio resources may be wasted when the UE does not transmit in the all assigned UL sub-frames.

Second, since TDD LTE UL/DL frame configurations are asymmetric (each UL sub-frame may have more than one DL sub-frame associated with it for transmission of corresponding ACK/NAKs), DL sub-frame association sets for each UL sub-frame are statically defined per each UL/DL frame configuration as illustrated in FIG. 14B. However, since the UE may not be able to transmit on all TX sub-frames defined in a static UL/DL frame configuration due to TX duty cycle limitation, the ACK/NAKs for DL sub-frames in a DL sub-frame association set for an untransmitted UL TX sub-frame cannot be transmitted and the network may re-transmit corresponding DL sub-frames. Eventually, this may lead to radio link failure.

Third, other layer one signals transmitted on UL PUCCH (such as periodic CQI and SRS) cannot be transmitted on assigned sub-frames due to the TX duty cycle. In other words, the UE was assigned an UL sub-frame and the network expects to receive periodic CQI and SRS in that sub-frame, but due to the TX duty cycle, the UE does not transmit in the assigned sub-frame. Such a condition may lead to the network determining to increase BLER (block error rate) unnecessarily which may eventually cause UL radio link failure. Therefore, improvements in the field are desirable.

Figure 15A:
Figure 15A:

As described above in reference to FIG. 14A, there are seven static TDD (time division duplex) UL/DL sub-frame allocations (configurations 0-6). Thus, based on the static configuration of the cell, the low power device (e.g., UE 106) may have up to six TX duty cycles, or power stages (or power states). For example, in some embodiments, as shown in FIG. 15A, the low power device may have six different power stages (states) 701-706 (e.g., may transmit between 1 and 6 times in a frame) for TDD UL/DL configuration 0 described above. The power stages may include a single transmission per frame (701a-b), two transmissions per frame (702), three transmissions per frame (703), four transmissions per frame (704), five transmissions per frame (705), or the prior art (e.g., standards defined for TDD UL/DL configuration 0) six transmissions per frame (706). Note that when the power stage (or TX duty cycle) includes less than six transmissions in a frame (e.g., the standard allocation), the network may allocate which sub-frames the low power device transmits in. For example, as shown at 701a and 701b, when the TX duty cycle is 1 transmission out of 10 sub-frames (1/10), the low power device may be allocated any of sub-frames 2 (701b), 3, 4 (701a), 7, 8, or 9. Signaling methods between the network and the low power device may be used to determine which sub-frames will be allocated for instances when the TX duty cycle is less than the prior art static UL/DL sub-frame allocation are described below in detail.

In some embodiments, TX power may be calculated based on current path loss, network minimum required PUCCH/PUSCH nominal power, and current UL power control command which may be specified in 3GPP specifications. Additionally, when the TX power changes, the low power device may be triggered to enter a different TX power stage (or change TX duty cycle) with an associated maximum number of TX sub-frames. Thus, the low power device may send information (e.g., maximum number of TX sub-frames in a frame) to the network (e.g., base station 102) via a MAC control element which, in some embodiments, may be included on any UL MAC PDU. In other words, the low power device may request to transmit in less than the statically configured number of sub-frames allocated by the network.

Figure 15B:
Figure 15C:
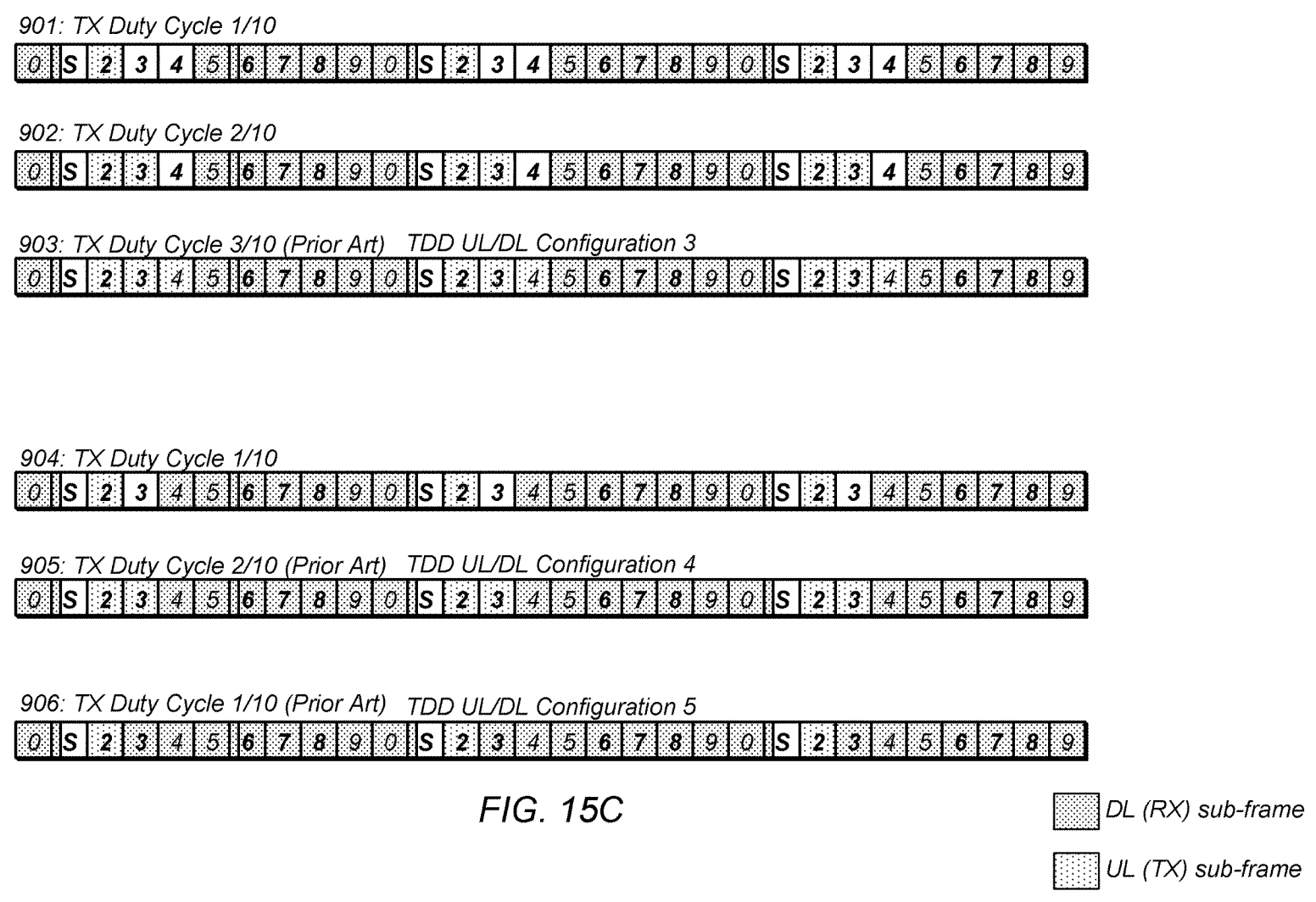
Figure 15D:
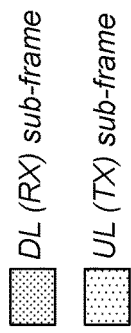

In response to receiving the information (e.g., the request from the low power device to transmit in less than the statically configured number of sub-frames), the network (base station 102) may allocate sub-frames to the low power device based on the static TDD UL/DL configuration of the cell. For example, as discussed above and illustrated in FIG. 15A, the network may allocate sub-frames to the low power device based on the TX duty cycle (or TX power stage) of the low power device and the static TDD UL/DL configuration for the cell. Thus, as shown at 702 of FIG. 15A, if the cell has configuration 0 and the low power device has a TX duty cycle of 2/10, the network may allocate sub-frames 2 and 3 to the low power device. Of course, since configuration 0 is defined to allocate 6 sub-frames for TX (UL), the network may assign any combination of the 6 sub-frames to the low power device based on the TX duty cycle. Thus, although sub-frames 2 and 3 are shown allocated, the network may allocate any two of sub-frames 2, 3, 4, 7, 8, and 9 if the low power device has a TX duty cycle of 2/10. FIGS. 15B-15D further illustrate possible configurations for various combinations of TX duty cycle of the low power device and static TDD UL/DL configurations.

Note that in some embodiments, the network may send the allocation (e.g., information) based on the TDD UL/DL configuration of the cell and the TX duty cycle of the low power device via a MAC control element which may be included on any DL MAC PDU.

As noted above in reference to FIG. 14B, the PUCCH/PUSCH in an UL sub-frame may carry ACK/NAKs for multiple DL sub-frames which form the DL association set for each assigned UL sub-frame. However, when the low power device requests less than the standard allocated UL sub-frames (e.g., due to a TX duty cycle of less than the standard allocation), the DL association set for each allocated UL sub-frame may be different from the allocation set for each TDD UL/DL configuration defined in the 3GPP LTE specification. For example, if an UL sub-frame that would have been allocated based on the defined static TDD UL/DL configuration but is not due to the low power device's TX duty cycle, the unassigned UL sub-frame's downlink association set may be merged to the next closest allocated UL sub-frame's downlink association set. For example, if the TDD UL/DL configuration is configuration 0 (standard allocation of 6 UL sub-frames and 2 DL sub-frames as DSUUUDSUUU) and the low power device has a TX duty cycle of 4/10, then the network may allocate sub-frames 4, 7, 8, and 9 and not allocate sub-frames 2 and 3 (modified allocation of 4 UL sub-frames and 2 DL sub-frames as DSxxUDSUUU). Since sub-frames 2 and 3 are not allocated, then sub-frame 2 and 3's downlink association sets (6 for sub-frame 2, none for sub-frame 3) may be merged to sub-frame 4's, which becomes {6, 4}. As another example, if the static TDD UL/DL configuration is configuration 1 (standard allocation of 4 UL sub-frames and 4 DL sub-frames as DSUUDDSUUD) and the low power device has a TX duty cycle of 3/10, then the network may allocate sub-frames 3, 7, and 8 and not allocate sub-frame 2 (modified allocation of 3 UL sub-frames and 4 DL sub-frames as DSxUDDSUUD). Since sub-frame 2 is not allocated, then sub-frame 2's downlink association set {7, 6} may be merged to sub-frame 3's, which becomes {7, 6, 4}.

In some embodiments, a downlink assignment index (DAI) in PDCCH DCIx and DCI0 (downlink control information formats) may be based on above merged downlink association set instead of as defined in the 3GPP standard. Thus, the DAI in DCI0 may represent the total number of DL sub-frames to be ACK/NAK in a merged downlink association set and the DAI in DCIx may represent the cumulative number of DL sub-frames to be ACK/NAK in the merged downlink association set.

Note that even though there are a maximum of 6 possible TX power stages (or TX duty cycles) for the low power device, the transitions between different power stages may not be necessary to trigger above mentioned message to network for a new UL sub-frame allocation. For example, in some embodiments, to avoid excessive messaging between the low power device and the network, the low power device may remain with less possible number of TX sub-frames in an allocation with higher TX power. In other words, if the low power device originally requested an allocation based on a TX duty cycle of x/10, the low power device may not request a new allocation based on a new duty cycle of y/10 (y greater than x) to avoid excessive messaging.

In certain embodiments, the network may not change UL allocation to a number of allocated TX sub-frames more than a previous allocation without the low power device's request. However, the network may change UL allocation with less or equal number of allocated TX sub-frames than a previous allocation without the low power device's request. In other words, if the low power device has a TX duty cycle of x/10, the network may vary the allocation so long as the low power device is not required to transmit more than x/10 sub-frames. This may allow the network scheduler to move the low power device's allocation within the frame to optimize available UL sub-frames for other UEs. Additionally, the network scheduler may downgrade the allocation due to detected higher UL BLER or other channel condition measures.

Dynamic Switch Between UL Sub-Frame Allocations in TDD-LTE

As mentioned above (and illustrated in FIG. 14A), there are 7 TDD static UL/DL frame configurations which are statically configured across all intra frequency cells. Additionally, based on the statically configured TDD UL/DL frame configuration and the low power device's requested TX duty cycle (number of TX sub-frames in a frame), each TDD UL/DL configuration may have multiple possible UL sub-frame allocations. For example, TDD UL/DL configuration 1 (standard allocation of 4 UL sub-frames and 4 DL sub-frames as DSUUDDSUUD) has 4 available UL sub-frame allocations for a TX duty cycle of 1/10 (DSUxDDSxxD, DSxUDDSxxD, DSxxDDSUxD, and DSxxDDSxUD). In other words, since TDD UL/DL configuration 1 is defined to have 4 UL sub-frames, the network may assign any of the 4 available UL sub-frames to a low power device requesting 1 UL sub-frame per frame. Further, if the TX duty cycle is 2/10, there are 6 available UL sub-frame allocations (DSUUDDSxxD, DSUxDDSUxD, DSUxDDSxUD, DSxUDDSUxD, DSxUDDSxUD, and DSxxDDSUUD). Thus, in addition to the above described low power device request for sub-frame allocation base on TX duty cycle, improvements in signaling to allow for dynamic switching between UL sub-frame allocations based on current UL/DL configuration and TX duty cycle is desirable.

Thus, in some embodiments, the low power device (e.g., UE 106) may inform the network (e.g., base station 102) of its currently supported TX duty cycle (e.g., the number of UL sub-frames the low power device is currently capable of transmitting in a frame) via a MAC control element as described above. In addition, the MAC control element may be 8 bits long to indicate the number of requested UL sub-frames in a frame and the UL sub-frame allocation from the TDD UL/DL static configuration may be considered the initial UL sub-frame configuration. Thus, any further UL sub-frame allocation or de-allocation from the network (e.g., in response to the low power device's request) may be an update to the initial (or existing) UL sub-frame allocation. For example, a new UL sub-frame allocation may add several UL sub-frames in a frame as newly allocated and delete several UL sub-frames in a frame as newly de-allocated.

In some embodiments, to update an UL sub-frame as newly de-allocated (e.g., deleted or removed), the network may use a DCI0 format in a DL PDCCH sub-frame. Note that DCI0 format may be normally used for the scheduling of corresponding UL PUSCH sub-frames. In such embodiments, the DCI0 format may be used to also indicate if the corresponding UL sub-frame is de-allocated. Further, if the MAC PDU transmitted in a previous hybrid automatic repeat request (HARQ) transmission cycle is acknowledged, then 2 bits are used: 1 bit for a de-allocation indictor and 1 bit for the ACK/NAK. Note that DCI0 includes the following information:

1. Flag for format0/format1A differentiation (1 bit).
2. Frequency hopping fag (1 bit).
3. Resource block assignment and hopping resource allocation ($[\log(N*(N+1)/2]$ bits).
4. Modulation and coding scheme and redundancy version (5 bits).
5. New data indicator (1 bit).
6. TPC command for scheduled PUSCH (2 bits).
7. Cyclic shift for DM RS (3 bits).
8. UL index (2 bits).
9. Downlink Assignment Index (2 bits).
10. CQI request (1 bit).

In some embodiments, the 2 bits for the de-allocation indicator and the ACK/NAK may be re-used from the bits from #2, #3, #4, #5, #6 and #7 of DCI0.

Note that after the PDCCH sub-frame with the specific DCI0 format (e.g., indicating the de-allocation of the UL sub-frame) is sent to the low power device, the network may expect an ACK from the low power device on the corresponding UL sub-frame for the sent DCI0 on the PUCCH. In addition, when the DCI0 format specifies the de-allocation of the UL sub-frame, the ACK/NAKs for the DL sub-frames in the to be de-allocated UL sub-frame's DL association set may be received by the network (and sent by the low power device) on the next closest active UL sub-frame as described above. In addition, once the network receives the ACK from the low power device on the corresponding UL sub-frame for the sent DCI0 on the PUCCH, the network may determine that allocation (e.g., the de-allocation of the UL sub-frame) is complete and further determine that the de-allocated UL sub-frame's downlink association set has been merged to next closest active UL sub-frame's downlink association set by the low power device. Note that the HARQ process associated with the de-allocated UL sub-frame may also be disabled. However, if no ACK is detected, the network may determine that the allocation (e.g., the de-allocation of the UL sub-frame) has not been completed and may transmit the specific DCI0 format on the same PDCCH sub-frame in a next allocation period (e.g., same sub-frame on next frame).

Additionally, to add an UL sub-frame in a frame as newly allocated, the network may also use a DCI0 format in a DL PDCCH sub-frame which normally is used for the scheduling of corresponding UL PUSCH sub-frame to implicitly indicate the corresponding UL sub-frame is allocated for further UL transmission which includes both PUSCH and PUCCH. Note that, if there is no PUSCH scheduling (e.g., only UL sub-frame allocation), the above DCI0 format's bits from #2, 3, 4, 5, 6, and 7 may be re-used for a one bit indicator of the UL sub-frame allocation. Note further that if a normal DCI0 in PDCCH is sent to the low power device for the to be allocated UL sub-frame and the network receives (and the low power device sends) PUSCH on the corresponding UL sub-frame, the network may determine that the adding of the UL sub-frame to the existing UL sub-frame allocation has been completed. Also, if the network receives (and the low power device sends) PUCCH with an ACK on the corresponding UL sub-frame, the network may determine that the adding of the UL sub-frame to the existing UL sub-frame allocation has been completed.

Once the allocation of the UL sub-frame has been completed (e.g., the newly added allocation has been added to the existing UL sub-frame allocation), then the newly allocated UL sub-frame's downlink association set may be established by the low power device. Thus, the content of the newly allocated UL sub-frame's downlink association set may be removed from the next closest allocated UL sub-frame's downlink association set and the network may establish a HARQ process associated with the newly allocated UL sub-frame.

Note that if neither the PUSCH nor the ACK on the PUCCH has been received by the network (or sent by the low power device) on the to be allocated UL sub-frame, then the network may repeat the above described procedure for adding the UL sub-frame in a frame as newly allocated in the next allocation period (e.g., the next frame).

Further, when the low power device receives the DCI0 format in the PDCCH sub-frame as described above, it may take the following actions:

If the DCI0 format indicates that the corresponding UL sub-frame is to be de-allocated, the low power device may disable the HARQ process corresponding to the to be de-allocated UL sub-frame. Additionally, if the specific DCI0 format indicates that the corresponding HARQ process is acknowledged, then the low power device may mark the corresponding radio link control (RLC) PDUs in the acknowledged MAC PDU as acknowledged. If the specific DCI0 format indicates that the corresponding HARQ process is not acknowledged, then the low power device may mark the corresponding RLC PDUs in the not acknowledged MAC PUD as not acknowledged and may further schedule them to be transmitted using other active UL HARQ processes. Additionally, the low power device may transmit an ACK for the received PDCCH sub-frame with the DCI0 format on the corresponding to be de-allocated UL sub-frame in order to inform the network that the removing of the to be de-allocated UL sub-frame has been completed. Note that the received PDCCH sub-frame may be part of the to be de-allocated UL sub-frame's downlink association set, of which all downlink PDSCH sub-frames received may be ACK/NAK in the next closest allocated UL sub-frame, along with all DL PDSCH sub-frames received in the downlink association set of the next closest allocated UL sub-frame.

If the DCI0 format indicates that the corresponding UL sub-frame is to be allocated (added, re-allocated, or newly allocated), then the low power device may associate an un-used (disabled) UL HARQ process with the to be allocated UL sub-frame and add it to the current set of active UL HARQ processes. Additionally, if it is a standard DCI0 format, then PUSCH with UL data may be sent by the low power device to the network (e.g., base station 102) on the to be allocated (e.g., newly activated) UL sub-frame which may implicitly indicate the procedure of allocating the to be allocated UL sub-frame into the existing sub-frame allocation has been completed. Otherwise, if it is a specific DCI0 format, then PUCCH with ACK may be sent by the low power device to the network (base station 102) on the to be allocated (e.g., newly activated) UL sub-frame to complete the procedure of adding the to be allocated UL sub-frame into the existing sub-frame allocation. Further, the low power device may establish a DL association set for the to be allocated (newly activated) UL sub-frame and remove any DL sub-frames included in the established DL association set from the next closest allocated UL sub-frame's DL association set.

UL/DL Sub-Frame Allocation in FDD Low Power LTE

Similar to the issues described above with respect to TDD, there are issues with respect to a low power device using a TX duty cycle as described above for frequency division duplex (FDD) LTE. First, as defined in the current LTE 3GPP specification (e.g., Rel-8 through Rel-12), FDD LTE UL and DL HARQ have a round trip time (RTT) of 8 ms. Thus, the use of a TX duty cycle as described above may violate this timeline. Additionally, the current LTE 3GPP specifications for FDD LTE do not define a mechanism for the low power device (e.g., UE 106) to inform the network (e.g., base station 102) of how many TX sub-frames the low power device may be capable of in a duty cycle period (e.g., how many sub-frames the low power device may be able to transmit in during an 8 ms RTT). There may be three consequences to not having such a mechanism: (1) based on the low power device's pending data buffer status report, the network may assign UL grants in multiple UL TX sub-frames, but the low power device may not be able to transmit in all UL sub-frames granted (allocated by the network) due to the TX duty cycle limitation which may lead to wasted network radio resources; (2) in FDD LTE, for any DL PUSCH sub-frame, the low power device must transmit its ACK/NAK on UL PUCCH/PUSCH sub-frame 4 ms later, however, since the low power device may not be able to transmit on all TX sub-frames allocated by the network due to the TX duty cycle limitation, the ACK/NAKs for received DL sub-frames on an un-transmitted UL TX sub-frame may not be transmitted which may cause the network to re-transmit corresponding DL sub-frames which may result in radio link failure; (3) other layer one signals transmitted on UL PUCCH such as periodic CQI and SRS may not be transmitted on untransmitted UL TX sub-frames due to the TX duty cycle limitation which could falsely lead the network to increase BLER and may also result in UL radio link failure. Therefore, improvements are desirable.

In LTE FDD, there are 8 UL sub-frames in an allocation period, thus, there are eight possible TX power stages, each associated with a number of TX sub-frames the low power device may be capable of transmitting in the 8 ms allocation period based on currently required TX power. The currently required TX power may be calculated based on current path loss, network minimum required PUCCH/PUSCH nominal power, and current UL power control command (specified in current LTE 3GPP specifications). Note that changing currently required TX power may trigger the low power device to enter a different TX power stage with an associated maximum number of TX sub-frames. Thus, in some embodiments, the low power device may send this information (number of capable TX sub-frames in an allocation period) to the network via a MAC control element. The MAC control element may be piggybacked on any UL MAC PDU.

Similar to the TDD scenario described above, the network may receive the maximum number of TX sub-frames request from the low power device. In some embodiments, the network may restrict UL sub-frames allocated to the low power device based on the request. The network may have four options for the UL sub-frame allocation restrictions. First, in some embodiments, if the low power device has indicated to the network (e.g., via an LTE capability indication message) that the low power device supports half-duplex for the band the low power device has camped on, then out of the 8 sub-frames in the allocation period, N may be for UL and 8-N may be for DL. In such instances (e.g., half-duplex mode), sub-frame allocation may be performed dynamically by the network (e.g., base station 102) via the network scheduler as mentioned in LTE 3GPP Rel-8 half-duplex LTE.

In such embodiments, the low power device may be able to transmit at any time per network schedule. Thus, the low power device, based on the network schedule, may be required to transmit UL PUSCH sub-frame based on DCI0 UL grant received in a DL PDCCH sub-frame 4 ms earlier and transmit DL ACK/NAK on a UL PDCCH/PUSCH sub-frame for a PDSCH sub-frame received 4 ms earlier. Note that the low power device may receive DL sub-frames unless doing transmission.

Alternatively, the allocation may be performed semi-statically by the network scheduler by assigning sub-frame allocations to the low power device via a sub-frame allocation configuration message in response to receiving the maximum number of TX sub-frames request from the low power device. The network may send the sub-frame allocation information to the low power device via a MAC control element which may be piggybacked on any DL MAC PDU.

Second, in some embodiments, if the low power device supports full duplex on the band it is camped on, then there are 8 DL sub-frames for DL reception in the allocation period and N UL sub-frames out of 8 may be assigned by the network for UL transmission. In some embodiments, the network (e.g., base station 102) may assign a sub-frame allocation to the low power device via a sub-frame allocation configuration message in response to receiving the maximum number of TX sub-frames request from low power device. The network may send the sub-frame allocation configuration message to the low power device via a MAC control element which, similar to the above, may be piggybacked on any DL MAC PDU.

Third, in some embodiments, whether the low power device supports only half duplex or both full and half duplex on the band it is camped on, control signaling may be used by the network to assign a sub-frame allocation to the low power device. Thus, in some embodiments, PUCCH/PUSCH in a UL sub-frame may carry ACK/NAKs for multiple DL sub-frames which form a DL association set for each assigned UL sub-frame. Note that as defined in the LTE 3GPP specifications, without any UL restriction, each UL sub-frame's DL association set includes one DL sub-frame which is received at sub-frame (n−4), where n is the UL sub-frame. Thus, if an UL sub-frame is not allocated, the unallocated UL sub-frame's downlink association set may be merged to a next closest allocated UL sub-frame's downlink association set. In other words, similar to TDD, the ACK/NACKs for multiple DL sub-frames are sent by the low power device in the allocated sub-frame. Hence, a downlink assignment index (DAI) may be introduced to FDD PDCCH DCIx and DCI0 from TDD, and may be based on above described merged downlink association set.

Fourth, in some embodiments, full duplex UEs (including low power devices) and half duplex UEs (including low power devices) may co-exist in a FDD cell. A time for downlink-to-uplink switch may be created at the low power device (e.g., UE 106) by ignoring the last OFDM symbol(s) in a sub-frame immediately preceding an UL sub-frame. Additionally, a time for uplink-to-downlink switch may be created by a timing advance such as (Nta+Nta_offset)Ts seconds, where Nta_offset=624Ts=20 us.

Figure 16A:
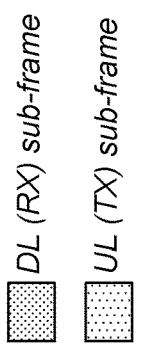
FIGS. 16A-16D illustrate FDD sub-frame allocations according to some embodiments.

In some embodiments, a default dynamic symmetric UL/DL sub-frame allocation may be created as part of the network schedule (e.g., via the scheduler of base station 102). Examples of such FDD symmetric UL/DL sub-frame allocations are illustrated in FIG. 16A. In such embodiments, control signaling (transmission and ACK/NACK of transmission) between the low power device and the network may be performed at fixed time intervals (e.g., such as 4 ms). Additionally, a change in the low power device's TX duty cycle configuration may be triggered by a low power device event (e.g., an increase or decrease in required TX power) and the low power device may send an UL MAC control element embedded in any UL MAC PDU indicating a new number of sub-frames the low power device may be currently capable of transmitting in an allocation period. Note that since the FDD UL/DL allocation is symmetric, a TX duty cycle of 1/8 means that the low power device may only transmit in 1 UL and receive in 1 DL sub-frame. Thus, such a configuration may not be able to utilize all available radio resources in DL heavy use cases and UL heavy use cases.

Figure 16B:
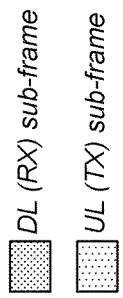
Figure 16C:
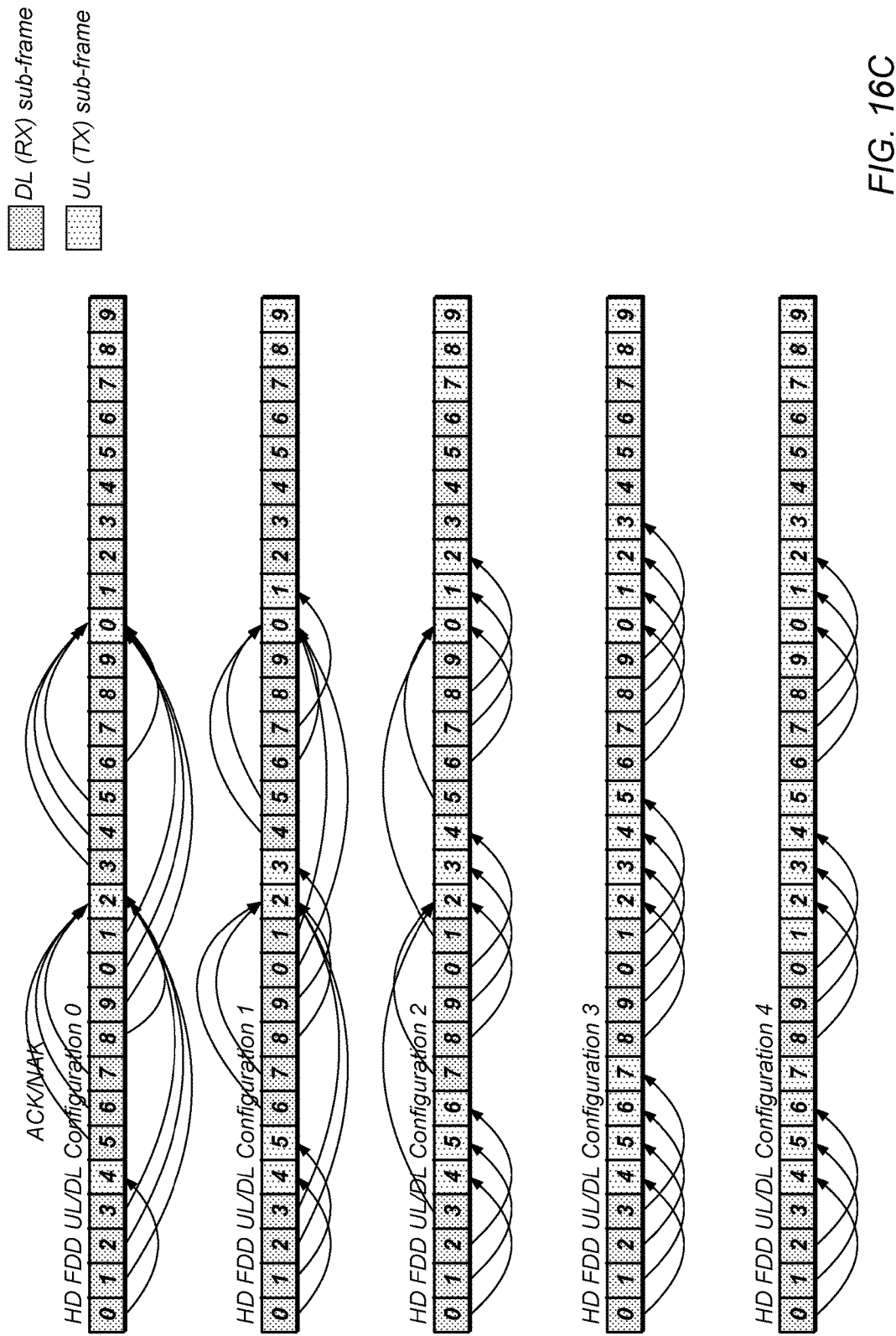
Figure 16D:
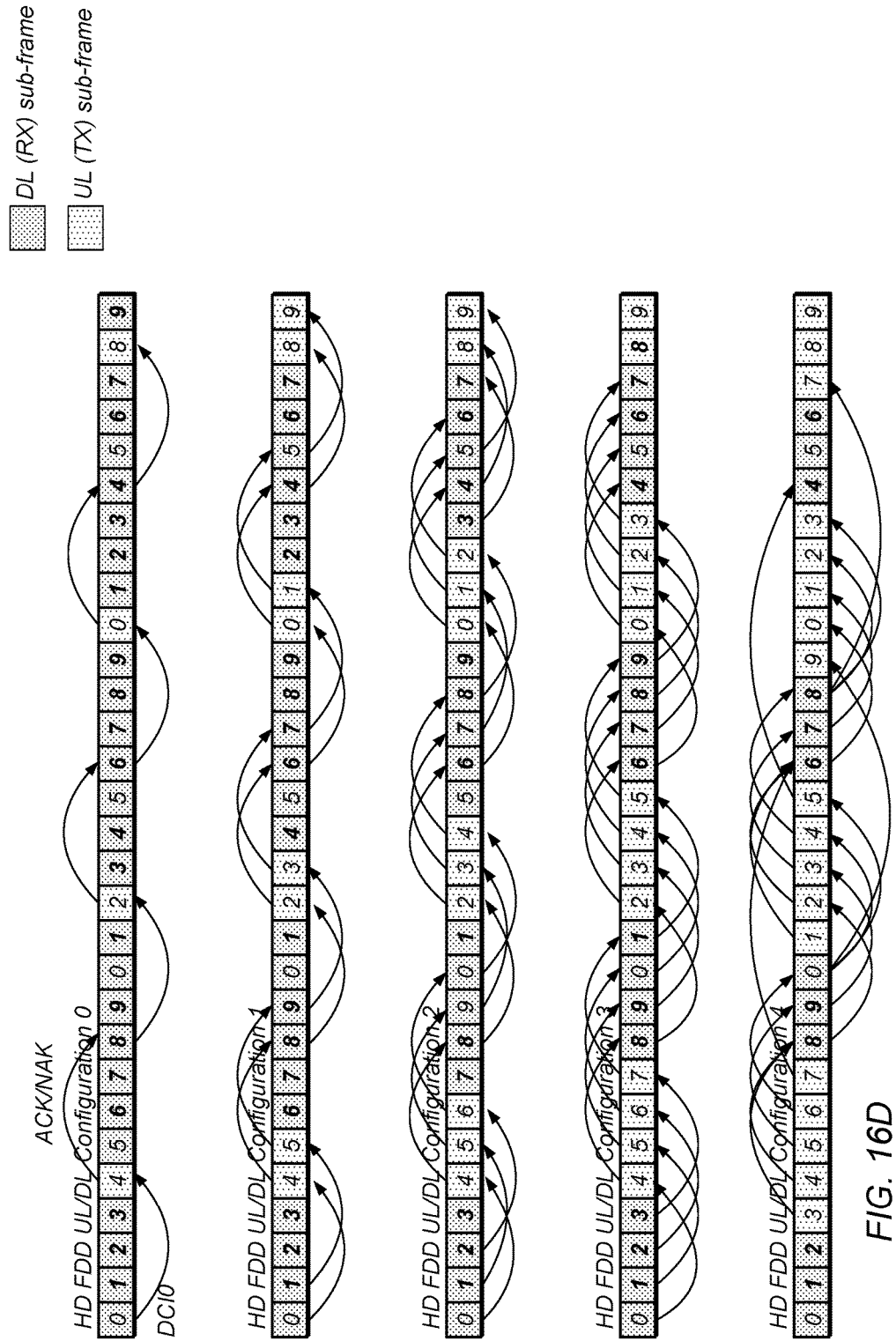

In other embodiments, a semi-static, non-symmetric FDD UL/DL sub-frame allocation scheme may be utilized as illustrated in FIG. 16B. Similar to the symmetric FDD UL/DL allocation, a change in the low power device's TX duty cycle configuration may be triggered by a low power device event (e.g., an increase or decrease in required TX power) and the low power device may send an UL MAC control element embedded in any UL MAC PDU indicating a new number of sub-frames the low power device may be currently capable of transmitting in an allocation period. In such embodiments, the number of DL to UL switches may be minimized and there may not be a need to have fixed DL sub-frames 0 and 5 for all UEs (including the low power device). Further, the control signaling may be similar to the control signaling method described above in reference to TDD. Thus, PUCCH/PUSCH in an UL sub-frame may include ACK/NAKs for multiple DL sub-frames. Additionally, there may be multiple ACK/NAK feedback modes: bundling and multiplexing. Further, PHICHs in DL sub-frames may carry ACK/NACKs for multiple UL sub-frames as illustrated in FIG. 16C. Thus, DCI fields in PDCCH may be related to the FDD UL/DL allocation. An UL index may include at least two bits for specifying UL UL/DL timing relationships for power control, CQI reporting, and HARQ transmissions. A downlink assignment index (DAI) may include at least two bits and may include information such as a number of PDSCHs in a downlink association set and may allow the low power device to detect missing PDSCH and PDCCH sub-frames. FIG. 16D illustrates the relationship between UL and DL sub-frames for receiving ACK/NAKs and UL grants on DL for UL PUSCH.

Note that DAI in DCI0 may represent the total number of DL sub-frames to be ACK/NAK in the merged downlink association set. In addition, note that DAI in DCIx may represent the cumulative number of DL sub-frames to be ACK/NAK in a merged downlink association set.

Note that in some embodiments, the low power devices transition between different power stages may not always trigger the low power device to send a message to the network for a new UL sub-frame allocation. Thus, in order to avoid excessive messaging between the low power device and the network, the low power device may stay with less than the maximum possible number of TX sub-frames in an allocation with higher TX power. Additionally, the network may not change the UL allocation to an allocation greater than a current (e.g., previous) allocation unless the low power device requests a new allocation with a greater number of TX sub-frames. However, the network may change the UL allocation to an allocation with less TX sub-frames than a previous (e.g., current) allocation without the low power device requesting a new allocation with a lesser number of TX sub-frames. Thus, for example, if the network scheduler determines that the low power device's allocation should be changed (either keeping the same number or UL sub-frames and changing which frames the low power device may use or reducing the number of UL sub-frames allocated to the low power device) in order to better use (e.g., optimize) network resources, then the allocation may be changed without the request of the low power device. Additionally, the network may downgrade (e.g., reduce the number of UL sub-frames allocated to the low power device) if the network detects an change in BLER or other channel quality indicator that may indicate deteriorating channel conditions that may result in increased TX power for successful transmission.

Further Embodiments

In some embodiments, a user equipment device (UE) may be configured to communicate with one or more base stations using radio frames that include multiple sub-frames, transmit information regarding allocation of a portion of the sub-frames of a respective radio frame for each of a plurality of the radio frames for the UE, and transmit and receive data using allocated sub-frames and not using unallocated sub-frames, wherein the allocated sub-frames comprise portions of the sub-frames for each of the plurality of the radio frames, wherein the portions are less than all of the sub-frames of each respective radio frame. The unallocated sub-frames of one or more of the plurality of the radio frames may be allocated to another UE. The information may indicate a set of rules for allocating sub-frames to the UE and set of rules may be based on detection of a low power condition or a poor radio condition.

The UE may also be configured to both transmit and receive data during the allocated sub-frames. The allocation may specify one or more sub-frames for receiving only and one or more sub-frames for transmitting only.

The UE may also be configured to send and receive hybrid automatic repeat request indications using the allocated sub-frames. The request may be included in a radio resource control (RRC) message and/or a media access control (MAC) protocol data unit (PDU) control element.

The UE may also be configured to request unlimited sub-frame allocation in response to a change in operating conditions.

In some embodiments, a method for providing improved communication performance in a cellular communication system may include a UE communicating with one or more base stations using radio frames that include multiple sub-frames, requesting allocation of a portion of the sub-frames of a respective radio frame for each of a plurality of the radio frames for the UE, and transmitting and receiving data using allocated sub-frames and not using unallocated sub-frames. The allocated sub-frames may include a portion of the sub-frames that is less than all of the sub-frames for each of the plurality of the radio frames. The requesting may be performed in response to an operating condition and may include information associated with the operating condition. Alternatively, or in addition, the requesting may be performed using at least one of a radio resource control (RRC) message and a media access control (MAC) protocol data unit (PDU) control element. The method may also include sending and receiving hybrid automatic repeat request indications using the allocated sub-frames.

The method may include a second UE communicating with the one or more base, requesting allocation of a second portion of the sub-frames of a respective radio frame for each of the plurality of the radio frames for the second UE, and transmitting and receiving data using sub-frames allocated to the second UE and not using sub-frames allocated to the UE. In such embodiments, the requests by the first and second UEs requesting may not specify particular sub-frames of the respective radio frame.

In some embodiments, a base station may be configured to receive, from a UE, a request for allocation of a portion of sub-frames for a respective radio frame of each of a plurality of radio frames, select sub-frames for the respective radio frame and allocate the selected sub-frames to the UE, wherein the allocated sub-frames make up a portion that is less than all of the sub-frames of the respective radio frame, and transmit data to the UE and receive data from the UE using the allocated sub-frames and not using unallocated sub-frames. The base station may also be configured to select the sub-frames of the respective radio frames to allocate to the UE based on sub-frame allocations for one or more other UEs and/or allocate different sub-frames of the respective radio frame to multiple different UEs. The base station may be configured to indicate the allocated sub-frames using at least one of a radio resource control (RRC) message and a media access control (MAC) protocol data unit (PDU) control element. Additionally, the base station may be configured to select the sub-frames based on a set of rules received from the UE, wherein the set of rules is based on power limitations of the UE.

In some embodiments, a UE may be configured to transmit first information comprising a number of uplink (UL) sub-frames to be transmitted in a frame and receive, from a base station, a first sub-frame allocation based on at least the first information. The UL sub-frames may be contiguous UL sub-frames. The first information may further comprise a number of downlink (DL) sub-frames to be received in a frame and the DL sub-frames may be contiguous DL sub-frames. The first information may also comprise a minimum number of sub-frames between transmit and receive. Additionally, the first information may be generated based on power limitations of the UE. The first information may be indicated in a field of a radio resource control (RRC) connection setup message. In addition, the first information may be stored in the base station. The UE may be configured according to the sub-frame allocation.

Further, the UE may be further configured to transmit second information indicating that the UE can transmit in all UL sub-frames and receive in all DL sub-frames and receive, from the base station, a second sub-frame allocation based on at least the second information. The second information may be transmitted by the UE when the UE is not power limited. The second information may be indicated in a field of a radio resource control (RRC) connection setup message. The first information and the second information may be stored in the base station.

In addition, the UE may be further configured to transmit third information indicating that the UE can transmit in only half duplex for frequency division duplexing (FDD).

In some embodiments, a UE may be configured to transmit first information to a base station indicating that the UE is in a first power state, receive, from the base station, a first sub-frame allocation based on at least the first information, and operate according to the first sub-frame allocation after receiving the first sub-frame allocation. The first power state may be one of power limited or not power limited.

The UE may be further configured to transmit second information to the base station indicating that the UE is in a second power state, wherein the second power state is different from the first power state, receive, from the base station, a second sub-frame allocation based on at least the second information, wherein the second sub-frame allocation is different than the first sub-frame allocation, and operate according to the second sub-frame allocation after receiving the second sub-frame allocation. The first power state may be a power limited state and the second power state is a not power limited state. Alternatively, the first power state may be a not power limited state and the second power state is a power limited state. When the first power state is a power limited state, the first information may comprise one or more of: 1) a number of contiguous uplink (UL) sub-frames to be transmitted in a frame; 2) a number of contiguous downlink (DL) sub-frames to be received in a frame; or 3) a minimum number of sub-frames between transmit and receive. When the first power state is a power limited state, the first information may comprise two or more of: 1) a number of contiguous uplink (UL) sub-frames to be transmitted in a frame; 2) a number of contiguous downlink (DL) sub-frames to be received in a frame; or 3) a minimum number of sub-frames between transmit and receive.

In some embodiments, a UE may be configured to transmit first information to a base station indicating that the UE is in a power limited state, receive, from the base station, a first sub-frame allocation based on at least the first information, operate according to the first sub-frame allocation after receiving the first sub-frame allocation, transmit second information indicating that the UE is not in the power limited state, receive, from the base station, a second sub-frame allocation based on at least the second information, and operate according to the second sub-frame allocation after receiving the second sub-frame allocation. The UE may be further configured to transmit the second information, receive the second sub-frame allocation, and operate according to the second sub-frame allocation before transmitting the first information, receiving the first sub-frame allocation, and operating according to the first sub-frame allocation. In addition, the UE may be further configured to transmit the second information in a sub-frame that is not allocated to the UE. The second information may be transmitted in one of a schedule request (SR) signal or a radio resource control (RRC) message. Alternatively, or in addition, the second information may be transmitted in a medium access control (MAC) control element as part of a UL MAC packet data unit (PDU). The UE may also be configured to determine that one or more of 1) a current power is below a power threshold or 2) current radio conditions are below a radio condition threshold, wherein the UE may transmit the first information in response to determining that one or more of 1) the current power is below the power threshold or 2) current radio conditions are below a radio condition threshold.

In some embodiments, a base station may be configured to receive first information from a user equipment device (UE) indicating that the UE is not in a power limited state, send a first sub-frame allocation based on at least the first information, operate according to the first sub-frame allocation after send the first sub-frame allocation, determine that the UE has not transmitted for a specified number of contiguous sub-frames, send a second sub-frame allocation based on at least the second information, and operate according to the second sub-frame allocation after sending the second sub-frame allocation. The second sub-frame allocation may comprise one or more of: 1) a number of contiguous uplink (UL) sub-frames to be transmitted in a frame; 2) a number of contiguous downlink (DL) sub-frames to be received in a frame; or 3) a minimum number of sub-frames between transmit and receive.

In some embodiments, a base station may be configured to receive, from a user equipment device (UE), first information comprising a number of uplink (UL) sub-frames to be transmitted in a frame and transmit a first sub-frame allocation based on at least the first information. The first information comprises one or more of: 1) a number of contiguous uplink (UL) sub-frames to be transmitted in a frame; 2) a number of contiguous downlink (DL) sub-frames to be received in a frame; or 3) a minimum number of sub-frames between transmit and receive and the first sub-frame allocation may comprise one or more of: 1) the number of contiguous uplink (UL) sub-frames to be transmitted in a frame; 2) the number of contiguous downlink (DL) sub-frames to be received in a frame; or 3) the minimum number of sub-frames between transmit and receive.

In some embodiments, a UE may be configured to transmit first information comprising one or more of: 1) a number of contiguous uplink (UL) sub-frames to be transmitted in a frame; 2) a number of contiguous downlink (DL) sub-frames to be received in a frame; or 3) a minimum number of sub-frames between transmit and receive, from a base station, a first sub-frame allocation based on at least the first information.

In some embodiments, a UE may be configured to transmit first information to a base station indicating that the UE is not in a power limited state, receive, from the base station, a first sub-frame allocation based on at least the first information, operate according to the first sub-frame allocation after receiving the first sub-frame allocation, and when the UE enters a power limited state, discontinue transmissions to the base station for a number of contiguous sub-frames, receive, from the base station, a second sub-frame allocation based on at least the UE entering the power limited state, and operate according to the second sub-frame allocation after receiving the second sub-frame allocation.

In some embodiments, a method for providing improved communication performance in a cellular communication system may include a UE performing transmitting, to a base station, first information comprising a number of uplink (UL) sub-frames to be transmitted in a frame and receiving, from the base station, a first sub-frame allocation based on at least the first information. The first information comprises one or more of: 1) a number of uplink (UL) sub-frames to be transmitted in a frame; 2) a number of continuous downlink (DL) sub-frames to be received in a frame; or 3) a minimum number of sub-frames between transmit and receive.

In some embodiments, a method for providing improved communication performance in a cellular communication system may include a UE performing transmitting first information to a base station indicating that the UE is in a power limited state, receiving, from the base station, a first sub-frame allocation based on at least the first information, operating according to the first sub-frame allocation after receiving the first sub-frame allocation, transmitting second information indicating that the UE is not in the power limited state, receiving, from the base station, a second sub-frame allocation based on at least the second information, and operating according to the second sub-frame allocation after receiving the second sub-frame allocation.

In some embodiments, a method for providing improved communication performance in a cellular communication system may include a UE performing transmitting first information to a base station indicating that the UE is not in a power limited state, receiving, from the base station, a first sub-frame allocation based on at least the first information, operating according to the first sub-frame allocation after receiving the first sub-frame allocation, transmitting second information indicating that the UE is in the power limited state, receiving, from the base station, a second sub-frame allocation based on at least the second information, and operating according to the second sub-frame allocation after receiving the second sub-frame allocation.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processing element (or a set of processing elements) or a processor (or a set of processors) and a memory medium, where the memory medium stores program instructions, where the processor (or processing element) is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   one or more processing elements coupled to the at least one radio, wherein the one or more processing elements and the at least one radio are configured to perform voice and/or data communications;
   wherein the one or more processing elements and the at least one radio are configured to cause the UE to:
   determine a power limitation at the UE;
   at a first time, in response to determining the power limitation at the UE, transmit a first indication to a base station indicating the power limitation at the UE via a first random access channel (RACH) preamble to request a configuration of a limited sub-frame allocation comprising a limited number of downlink and uplink sub-frames, wherein the first indication is indicated by a selection of a first RACH preamble and/or a first RACH sub-frame location;
   perform transmit and receive operations during sub-frames of the limited sub-frame configuration;
   at a second time, transmit a second indication to the base station via a second RACH to request a configuration of a full sub-frame allocation comprising a frequency division duplex (FDD) sub-frame configuration without a half duplex FDD limitation, wherein the second indication is indicated by selection of a second RACH preamble and/or a second RACH sub-frame location; and
   perform transmit and receive operations during any of the FDD sub-frames.

2. The UE of claim 1,
wherein the UE co-exists in a cell served by the base station with at least one other UE, wherein the at least one other UE does not have a power limitation and is configured to communicate according to an unlimited sub-frame configuration and full duplex frequency division duplex (FD-FDD).

3. The UE of claim 1,
wherein the power limitation results in a limited radio frequency (RF) range for the UE.

4. The UE of claim 1,
wherein the power limitation at the UE is associated with one or more of:
   battery charge state of the UE; or
   thermal conditions at the UE.

5. The UE of claim 1,
wherein the one or more processing elements and the at least one radio are further configured to cause the UE to:
   transmit, within a subframe allocation based on a RACH configuration used by the UE for random access, at least a msg3 of a RACH procedure associated with the indication transmitted via the RACH.

6. The UE of claim 1,
wherein, to determine the power limitation at the UE the one or more processing elements and the at least one radio are further configured to cause the UE to:
   monitor one or more metrics associated with transmission performance of the UE; and
   determine that at least one metric indicates that the UE needs to reduce transmissions.

7. The UE of claim 6,
wherein, to determine that the at least one metric indicated that the UE needs to reduce transmissions, the one or more processing elements and the at least one radio are further configured to cause the UE to:
compare the at least one metric to a threshold associated with the at least one metric;
wherein said determining that at least one metric of the one or more metrics indicates that the UE needs to reduce transmissions is based on said comparing.

8. The UE of claim 6,
wherein the one or more metrics comprise one or more of:
   transmission blanking rate;
   audio frame error rate;
   chemical charge level of a battery of the UE;

chemical charge dissipation rate of the battery of the UE; and
thermal load on the UE.

9. The UE of claim 1,
wherein the UE is a wearable device.

10. An apparatus, comprising:
a memory; and
one or more processors in communication with the memory, wherein the one or more processors are configured to:
   determine a power limitation associated with the apparatus;
   at a first time, in response to determining the power limitation, generate instructions to transmit an indication to a base station indicating the power limitation via a first random access channel (RACH) preamble to request a configuration of a limited sub-frame allocation comprising a limited number of downlink and uplink sub-frames, wherein the first indication is indicated by a selection of a first RACH preamble and/or a first RACH sub-frame location;
   generate instructions to perform transmit and receive operations during sub-frames of the limited sub-frame configuration;
   at a second time, generate instructions to transmit a second indication to the base station via a second RACH to request a configuration of a full sub-frame allocation comprising a frequency division duplex (FDD) sub-frame configuration without a half duplex FDD limitation, wherein the second indication is indicated by selection of a second RACH preamble and/or a second RACH sub-frame location; and
   generate instructions to perform transmit and receive operations during any of the FDD sub-frames.

11. The apparatus of claim 10,
wherein the apparatus co-exists in a cell served by the base station with at least one user equipment device (UE), wherein the at least one UE does not have a power limitation and is configured to communication according to an unlimited sub-frame configuration and full duplex frequency division duplex (FD-FDD).

12. The apparatus of claim 10,
wherein the power limitation results in a limited radio frequency (RF) range.

13. The apparatus of claim 10,
wherein the power limitation is associated with one or more of:
   battery charge state of a battery powering the apparatus;
   radio conditions; or
   thermal conditions near the apparatus.

14. The apparatus of claim 10,
wherein the one or more processors are further configured to:
   transmit, within a subframe allocation based on a RACH configuration used for random access, at least a msg3 of a RACH procedure associated with the indication transmitted via the RACH.

15. The apparatus of claim 10,
wherein, to determine the power limitation, the one or more processors are further configured to:
   monitor one or more metrics associated with transmission performance; and
   determine that at least one metric indicates a need to reduce transmissions.

16. A non-transitory computer readable memory medium storing program instructions executable by processing circuitry of a user equipment device (UE) to:
   determine a power limitation at the UE;
   at a first time, in response to determining the power limitation at the UE, generate instructions to transmit an indication to a base station indicating the power limitation at the UE via a random access channel (RACH) preamble to request a configuration of a limited sub-frame allocation comprising a limited number of downlink and uplink sub-frames, wherein the first indication is indicated by a selection of a first RACH preamble and/or a first RACH sub-frame location;
   generate instructions to perform transmit and receive operations during sub-frames of the limited sub-frame configuration;
   at a second time, generate instructions to transmit a second indication to the base station via a second RACH to request a configuration of a full sub-frame allocation comprising a frequency division duplex (FDD) sub-frame configuration without a half duplex FDD limitation, wherein the second indication is indicated by selection of a second RACH preamble and/or a second RACH sub-frame location; and
   generate instructions to perform transmit and receive operations during any of the FDD sub-frames.

17. The non-transitory computer readable memory medium of claim 16,
wherein the UE co-exists in a cell served by the base station with at least one other UE, wherein the at least one other UE does not have a power limitation and is configured to communicate according to an unlimited sub-frame configuration and full duplex frequency division duplex (FD-FDD).

18. The non-transitory computer readable memory medium of claim 16,
wherein the power limitation results in a limited radio frequency (RF) range for the UE.

19. The non-transitory computer readable memory medium of claim 16,
wherein the power limitation at the UE is associated with one or more of:
   battery charge state of the UE;
   radio conditions at the UE; or
   thermal conditions at the UE.

20. The non-transitory computer readable memory medium of claim 16,
wherein the program instructions are further executable by processing circuitry to:
   transmit, within a subframe allocation based on a RACH configuration used by the UE for random access, at least a msg3 of a RACH procedure associated with the indication transmitted via the RACH.

* * * * *